US012779855B2

(12) United States Patent
Kajihara

(10) Patent No.: US 12,779,855 B2
(45) Date of Patent: Nov. 3, 2026

(54) PRINTING APPARATUS AND ROLLER MAINTENANCE METHOD

(71) Applicant: SCREEN Holdings Co., Ltd., Kyoto (JP)

(72) Inventor: Kaisei Kajihara, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 91 days.

(21) Appl. No.: 19/042,318

(22) Filed: Jan. 31, 2025

(65) Prior Publication Data

US 2025/0296340 A1 Sep. 25, 2025

(30) Foreign Application Priority Data

Mar. 25, 2024 (JP) ................................ 2024-048343

(51) Int. Cl.
*B41J 2/165* (2006.01)

(52) U.S. Cl.
CPC ....... *B41J 2/16538* (2013.01); *B41J 2/16508* (2013.01); *B41J 2/16541* (2013.01); *B41J 2/16552* (2013.01)

(58) Field of Classification Search
CPC ...................................................... B41J 2/1651
See application file for complete search history.

(56) References Cited

U.S. PATENT DOCUMENTS

2023/0311512 A1* 10/2023 Kajihara .............. B41J 2/16508 347/29
2024/0100832 A1* 3/2024 Kajihara .............. B41J 2/16547
2024/0100834 A1* 3/2024 Kajihara .............. B41J 2/16547
2024/0326445 A1* 10/2024 Kajihara .............. B41J 2/16538

FOREIGN PATENT DOCUMENTS

JP 2008273065 A * 11/2008 ............... B08B 1/54
JP 2009-018249 A 1/2009
JP 4802173 B2 * 10/2011 .......... B41J 2/16585

* cited by examiner

*Primary Examiner* — Julian D Huffman
(74) *Attorney, Agent, or Firm* — Rimon P.C.

(57) ABSTRACT

The cleaning roller extends in the width direction inclined with respect to the Y direction. The cleaning liquid is supplied to this cleaning roller from above. The cleaning liquid supplied to the cleaning roller in this way moves downward by gravity. At this time, since the cleaning roller is inclined with respect to the Y direction, the cleaning liquid spreads also in an extension direction of the cleaning roller (i.e. width direction) according to a downward movement.

14 Claims, 16 Drawing Sheets

PRINTING APPARATUS AND ROLLER MAINTENANCE METHOD

CROSS REFERENCE TO RELATED APPLICATION

The disclosure of Japanese Patent Application No. 2024-048343 filed on Mar. 25, 2024 including specification, drawings and claims is incorporated herein by reference in its entirety.

BACKGROUND

1. Technical Field

This disclosure relates to a roller maintenance technique for cleaning a wiper for wiping an ink from a nozzle opening plane of an inkjet device including an opening for discharging the ink.

2. Background Art

JP 2009-018249A describes an inkjet type discharging device for performing wiping to wipe an ink adhering to a nozzle plate by a blade. This discharging device is also equipped with a roller for cleaning the blade, and the ink adhering to the blade is transferred to the roller by moving the blade with the roller held in contact with the blade. This discharging device is further equipped with a cleaning blade and a cleaning liquid supplier to remove the ink from the roller. The cleaning blade removes the ink from the roller by contacting the roller. Further, the cleaning liquid supplier removes the ink remaining on the roller without being removed by the cleaning blade. That is, the cleaning liquid supplier supplies a cleaning liquid to a region of the roller not in contact with the cleaning blade, thereby removing the ink from this region.

SUMMARY

In patent literature 1 described above, the cleaning blade and the cleaning liquid supplier share roles to clean mutually different regions of the roller. In contrast, it is thought to use the cleaning liquid for increasing the cleaning efficiency of a cleaning block for cleaning the roller by contacting the roller. That is, by cleaning the roller by bringing the cleaning block into contact with the roller having the cleaning liquid supplied thereto, high cleaning efficiency can be expected. However, in such a case, it is important to efficiently spread the cleaning liquid to the roller.

This disclosure was developed in view of the above problem and aims to enable a cleaning liquid to efficiently spread to a roller in cleaning the roller by bringing a cleaning block into contact with the roller having a cleaning liquid supplied thereto.

A printing apparatus according to the disclosure comprises: an inkjet head including a nozzle opening plane having an opening for discharging an ink; a wiper which wipes the ink from the nozzle opening plane by contacting the nozzle opening plane of the inkjet head; a roller which extends in an inclination direction inclined with respect to a horizontal direction and contacts the wiper; a cleaning liquid supplier which supplies a cleaning liquid to the roller from above the roller; and a cleaning block which contacts the roller, the roller cleaning the wiper by moving an adhering substance adhering to the wiper to the roller by contacting the wiper, and the cleaning block cleaning the roller by contacting the roller to which the cleaning liquid is supplied.

A roller maintenance method, according to the disclosure, for cleaning a wiper, which wipes an ink on a nozzle opening plane of an inkjet head including an opening for discharging the ink, comprises: supplying a cleaning liquid from above to a roller extending in an inclination direction inclined with respect to a horizontal direction; and cleaning the roller by a cleaning block contacting the roller to which the cleaning liquid is supplied.

In the disclosure (printing apparatus and roller maintenance method) thus configured, the roller extends in the inclination direction inclined with respect to the horizontal direction. The cleaning liquid is supplied to this roller from above. The cleaning liquid supplied to the roller in this way moves downward by gravity. At this time, since the roller is inclined with respect to the horizontal direction, the cleaning liquid spreads also in an extension direction of the roller according to a downward movement. In this way, the cleaning liquid can be efficiently spread to the roller in cleaning the roller by bringing the cleaning block into contact with the roller having the cleaning liquid supplied thereto.

As described above, according to the disclosure, a cleaning liquid can be efficiently spread to the roller in cleaning the roller by bringing a cleaning block into contact with the roller having the cleaning liquid supplied thereto.

The above and further objects and novel features of the disclosure will more fully appear from the following detailed description when the same is read in connection with the accompanying drawing. It is to be expressly understood, however, that the drawing is for purpose of illustration only and is not intended as a definition of the limits of the disclosure.

DETAILED DESCRIPTION

Figure 1:
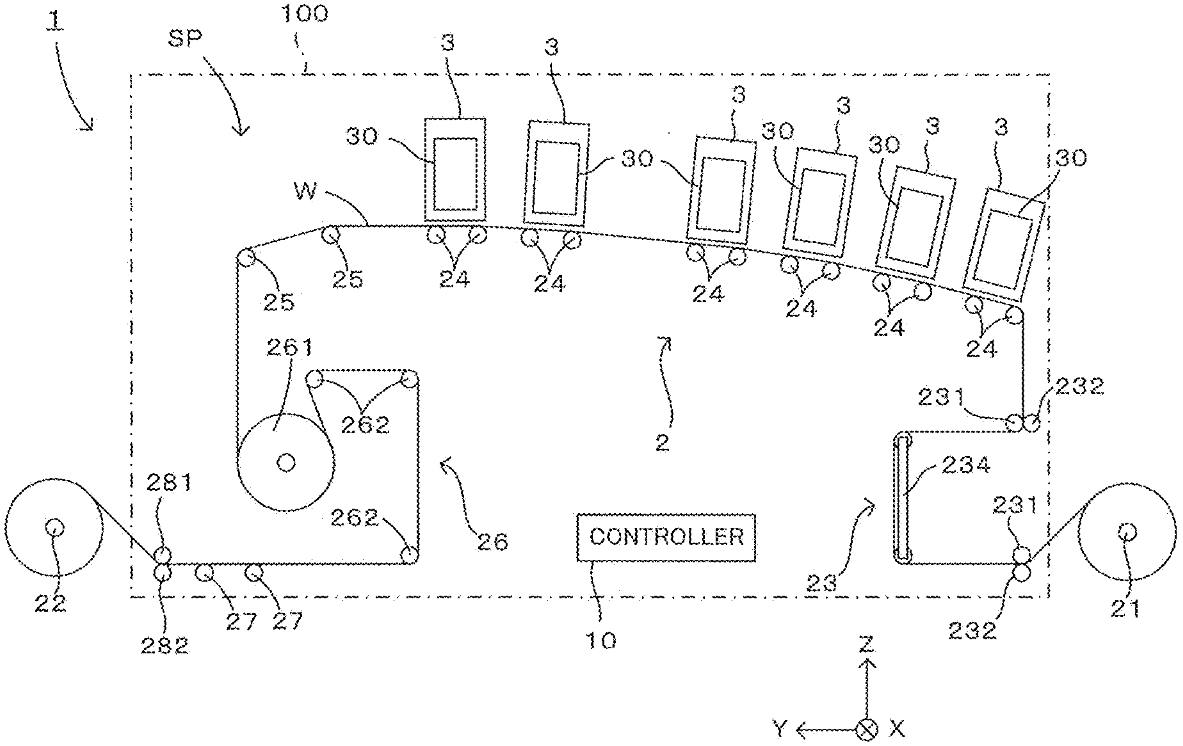
FIG. 1 is a front view schematically showing an example of a printing apparatus according to the disclosure.

FIG. 1 is a front view schematically showing an example of a printing apparatus according to the disclosure. In FIG. 1 and subsequent figures, an X direction, which is a horizontal direction, a Y direction, which is a horizontal direction orthogonal to the X direction, and a Z direction, which is a vertical direction, are appropriately shown. The printing apparatus 1 prints an image on a web W by discharging inks to the web W by an inkjet method while conveying the web W in the form of a long strip in a roll-to-roll manner in a housing 100. The web W is made of paper or film and is flexible. The printing apparatus 1 is provided with a controller 10 for integrally controlling the entire apparatus, and a control required for a printing operation for the web W is executed by the controller 10. This controller 10 is constituted by a processor such as a CPU (Central Processing Unit).

The printing apparatus 1 is provided with a conveyor 2 for conveying the web 10. The conveyor 2 includes a feeding roller 21 and a winding roller 22, and conveys the web W in a roll-to-roll manner by winding the web W fed by the feeding roller 21 by the winding roller 22. This conveyor 2 is provided with a take-in part 23 for taking in the web W fed from the feeding roller 21 between the feeding roller 21 and the winding roller 22. The take-in part 23 includes two drive rollers 231, two nip rollers 232 and an edge position adjuster 234 provided between the two drive rollers 231. Each drive roller 231 drives the web W by being rotated by a drive force of a motor while the web W is wound thereon. The two nip rollers 232 are respectively provided to correspond to the two drive rollers 231, and the web W is nipped between the respective nip rollers 232 and the corresponding drive rollers 231. The edge position adjuster 234 adjusts end positions of the web W in the X direction, which is a width direction of the web W.

Further, the conveyor 2 includes a plurality of support rollers 24 for supporting the web W between the take-in part 23 and the winding roller 22. These support rollers 24 convey the web W in the Y direction while supporting the web W, to which the inks are discharged by the inkjet method, from below. Particularly, the plurality of support rollers 24 are obliquely arrayed so that the support roller 24 on a more downstream side in a conveying direction of the web W (Y direction) is located at a higher position. Therefore, the web W conveyed by these support rollers 24 is obliquely conveyed to be elevated as moving in the Y direction.

Further, the conveyor 2 includes a plurality of support rollers 25 for supporting the web W between these support rollers 24 and the winding roller 22 and a drier 26 arranged between these support rollers 25 and the winding roller 22. The drier 26 includes a heat drum 261 and support rollers 262 for supporting the web W moving from the heat drum 261 toward the winding roller 22. The heat drum 261 is rotated and driven according to the conveyance of the web W and dries the web W by heating the web W by a built-in heater. Further, the conveyor 2 includes a plurality of support rollers 27 for supporting the web W moving from the drier 26 toward the winding roller 22. Furthermore, the conveyor 2 includes a drive roller 281 and a nip roller 282 arranged between these support rollers 27 and the winding roller 22. The drive roller 281 drives the web W by being rotated by a drive force of a motor while the web W is wound thereon. The web W is nipped between the nip roller 282 and the drive roller 281.

As just described, the conveyor 2 forms a conveyance path for the web W by a combination of rollers and conveys the web W along the conveyance path. Although most of the conveyance path is formed in an internal space SP of the housing 100, a part thereof, e.g. at least one of the feeding roller 21 and the winding roller 22, may be provided outside the housing 100. By doing so, workability in mounting and removing the rolled web W on and from the feeding roller 21 and the winding roller 22 can be enhanced.

The printing apparatus 1 includes a plurality of head units 3 facing, from above, the web W supported by the plurality of support rollers 24 in the housing 100. Although described in detail later, each head unit 3 includes a printing head 30 for discharging the ink downward from discharge ports (nozzles) provided in a lower part and adhering the ink to the web W being conveyed below. For example, color printing is realized by the printing heads 30 provided in the respective head units 3 discharging inks of mutually different colors. In this example, six head units 3 are arranged along the conveyance path, but the number of the head units 3 arranged is arbitrary without being limited to this. Further, a combination of types of the inks discharged from the respective printing heads 30 is also arbitrary. Furthermore, a plurality of printing heads may be provided for one head unit.

Note that, as shown in FIG. 1, angles of the plurality of respective head units 2 with respect to a horizontal direction (Y direction) are different from each other. However, the configuration of the head unit 3 except the angle can be made common among the respective head units 3. Accordingly, in the following description of the head units 3, angle differences of the respective head units 3 are ignored unless otherwise specified.

Figure 2A:
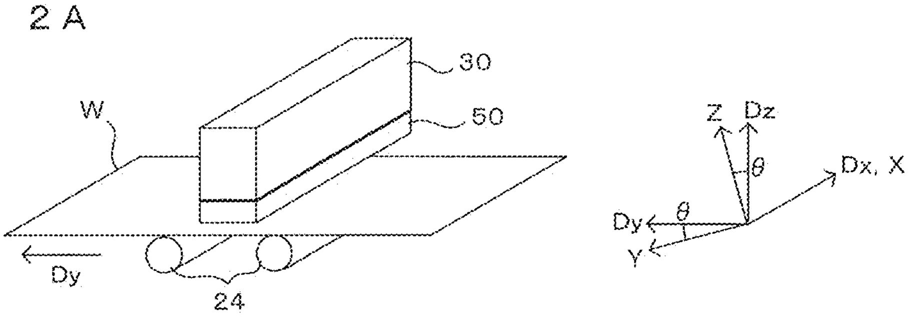
FIG. 2A a diagram showing a positional relationship of the printing head of the head unit, the maintenance unit and the web.
Figure 2B:
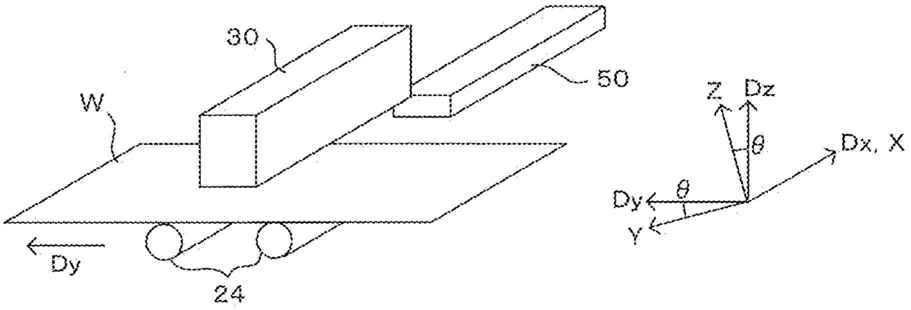
FIG. 2B a diagram showing a positional relationship of the printing head of the head unit, the maintenance unit and the web.
Figure 2C:
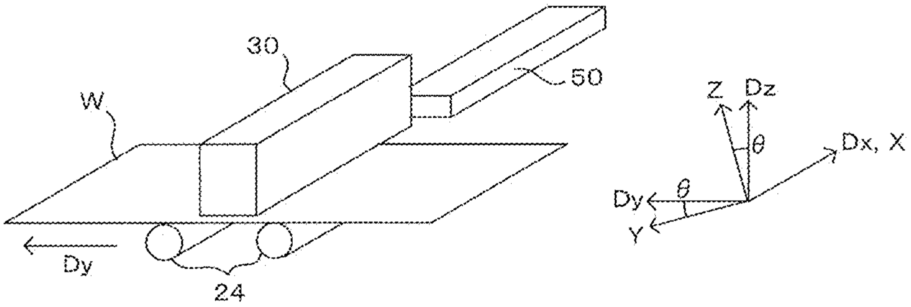
FIG. 2C is a diagram showing a positional relationship of the printing head of the head unit, the maintenance unit and the web.

As shown in FIGS. 2A to 2C, the printing apparatus 1 is provided with a maintenance unit 50 which performs maintenance for the head unit 3. Here, FIGS. 2A to 2C are diagrams showing a positional relationship of the printing head of the head unit, the maintenance unit and the web. Note that, in the printing apparatus 1, a plurality of the maintenance units 50 are arranged to respectively correspond to the plurality of head units 3, and each maintenance unit 50 performs maintenance for the corresponding head unit 3. The maintenance unit 50 is arranged at an angle corresponding to the corresponding head unit 3, and angles of the plurality of maintenance units 50 with respect to the Y direction are different from each other. However, the configuration of the maintenance unit 50 except the angle can be made common among the respective maintenance units 50. Accordingly, in the following description of the maintenance units 50, angle differences of the respective maintenance units 50 are ignored unless otherwise specified.

A length direction Dx, a width direction Dy and a height direction Dz of the maintenance unit 50 are shown in FIGS. 2A to 2C. The length direction Dx, the width direction Dy and the height direction Dz are orthogonal to each other. The length direction Dx is parallel to the X direction, the width direction Dy is inclined by an angle θ with respect to the Y direction, and the height direction Dz is inclined by the angle θ with respect to the Z direction. That is, a state where the maintenance unit 50 is arranged to be inclined by the angle θ with respect to the Y direction is shown. Note that the inclination of the maintenance unit 50 is suppressed so that a gravity does not affect the discharge of the ink by the inkjet method, and the height direction Dz does not largely deviate from the Z direction. Therefore, an arrow side in the height direction Dz is referred to as an upper side in the height direction Dz, and a side opposite to the arrow in the height direction Dz is referred to as a lower side in the height direction Dz.

The web W supported by the support rollers 24 is facing the printing heads 30 from below. The web W is conveyed by the support rollers 24 with a top surface (surface to be printed) of the web W facing upward. A direction of an axis of rotation of each support roller 24 is parallel to the horizontal direction, more specifically the X direction. Therefore, the web W is conveyed in the width direction Dy orthogonal to the X direction.

FIG. 2A shows a standby state where a printing operation is not performed. In the standby state, the printing head 30 is retracted upward from the web W supported and conveyed by the support rollers 24 and a gap wider than the height of the maintenance unit 50 is formed between the web W and the printing head 30. In contrast, the maintenance unit 50 is located between the lower surface of the printing head 30 and the upper surface of the web W.

From the standby state of FIG. 2A, the maintenance unit 50 can move in the X direction and be retracted from between the web W and the printing head 30 (FIG. 2B). In this way, a lower side of the printing head 30 is released and the lower surface of the printing head 30 faces the web W. Further, as described later, as the maintenance unit 50 moves in the X direction along the lower surface of the printing head 30, the maintenance unit 50 performs a maintenance operation for the nozzles provided in the lower surface of the printing head 30. Furthermore, a cleaning operation for the maintenance unit 50 is also performed.

Further, the printing head 30 can be raised and lowered. With the printing head 30 lowered most, the lower surface of the printing head 30 is proximate to or facing the upper surface of the web W as shown in FIG. 2C. In this state, the ink is discharged from the nozzles to perform printing on the web W. The position of the printing head 30 at this time is referred to as a "printing position" in the description later. When printing is finished, the printing head 30 is moved upward again and the maintenance unit 50 moves to between the printing head 30 and the web W. In this way, return is made to the standby state shown in FIG. 2A.

Figure 3:
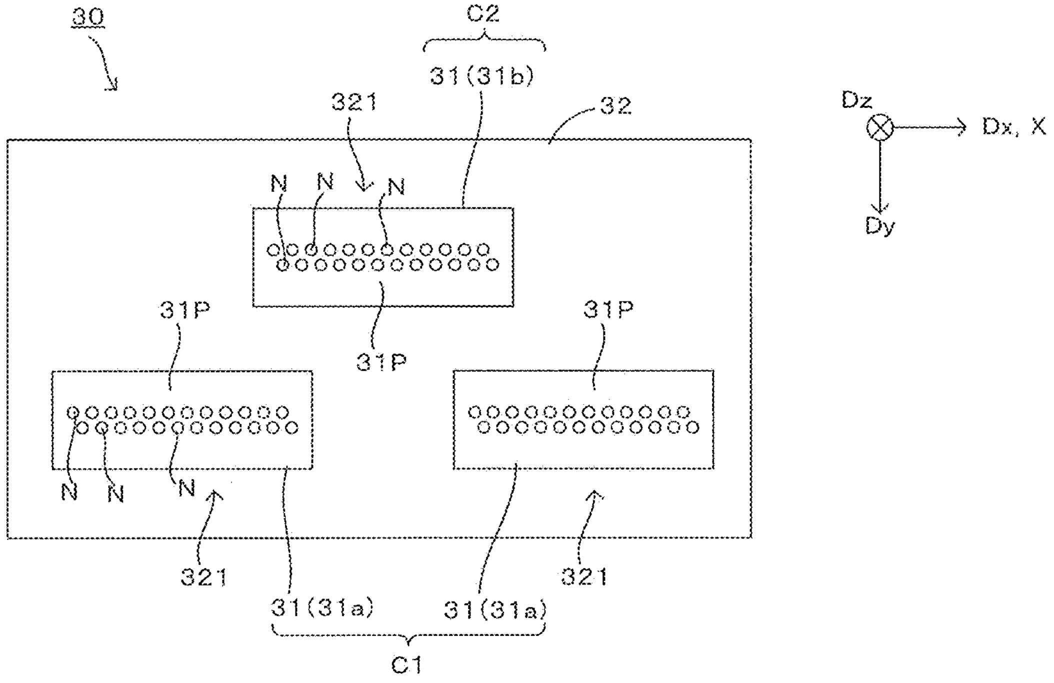
FIG. 3 is a bottom view schematically showing the configuration of the printing head.

FIG. 3 is a bottom view schematically showing the configuration of the printing head. The printing head 30 includes a plurality of (three in this embodiment) nozzle blocks 31. The plurality of nozzle blocks 31 are arrayed in two rows in the X direction in a so-called staggered manner. In other words, a nozzle block row C1 composed of two nozzle blocks 31 arrayed in parallel to the X direction and a nozzle block row C2 composed of one nozzle block 31 arrayed in parallel to the X direction are provided at a predetermined interval in the width direction Dy.

The printing head 30 includes a holding member 32 which holds the plurality of nozzle blocks 31. The holding member 32 includes a plurality of insertion holes 321 provided to correspond to the plurality of nozzle blocks 31, and the plurality of nozzle blocks 31 are respectively fixed to the holding member 32 while being inserted in the corresponding insertion holes 321. Such a holding member 32 can be constituted by a non-elastic material such as metal or resin. Note that the nozzle blocks 31 included in the nozzle block row C1 are referred to as "nozzle blocks 31*a*" and the nozzle block 31 included in the nozzle block row C2 is referred to as a "nozzle block 31*b*".

A nozzle opening plane 31P facing the upper surface of the web W from above is provided on the lower surface of each nozzle block 31. In this nozzle opening plane 31P, a plurality of nozzles N (ink discharge nozzles) are arranged in a staggered manner in the X direction. The nozzles N are open downward in the nozzle opening plane 31P and discharge the ink downward in the inkjet method.

Figure 4:
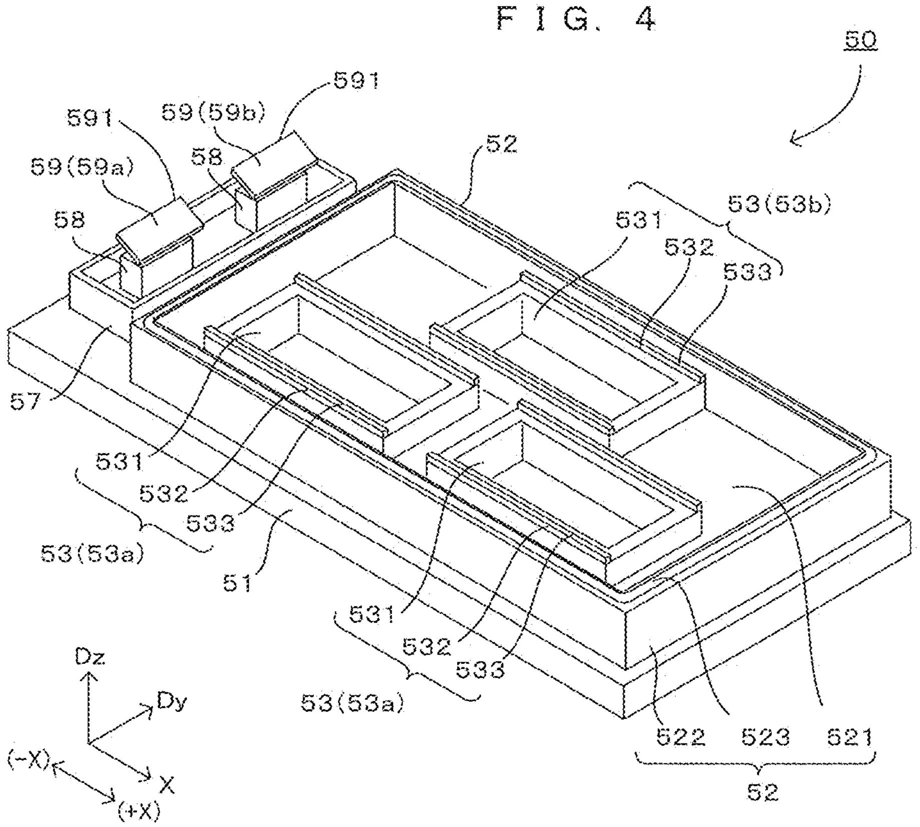
FIG. 4 is a perspective view schematically showing the configuration of the maintenance unit.

FIG. 4 is a perspective view schematically showing the configuration of the maintenance unit. In FIG. 4, a (+X) direction and a (−X) direction respectively parallel to the X direction and opposite to each other are shown. As described above, the maintenance units 50 are provided to respectively correspond to the plurality of printing heads 30, and each maintenance unit 50 faces the corresponding printing head 30 from below. The plurality of maintenance units 50 provided to correspond to the plurality of printing heads 30 have a common configuration. Accordingly, one maintenance unit 50 is described.

The maintenance unit 50 includes a base member 51 having a rectangular parallelepiped shape long in the X direction. Box-shaped bats 52, 57 open upward are mounted on this base member 51 to receive the ink and various processing liquids discharged from the nozzle blocks 31. A plurality of caps 53 are arranged inside the larger bat 52. The plurality of these caps 53 are provided to respectively correspond to the plurality of nozzle blocks 31 of the printing head 30. Note that the caps 53 corresponding to the nozzle blocks 31*a* are referred to as "caps 53*a*" and the cap 53 corresponding to the nozzle block 31*b* is referred to as a "cap 53*b*". The bat 52 includes a bottom plate 521 having a rectangular shape in a plan view and a side wall 522 rising upward from a peripheral edge part of the bottom plate 521. The side wall 522 is a frame body having a rectangular shape in the plan view. An elastic member 523 is attached to the entire periphery of the upper end of the side wall 522.

The cap 53 includes a cap body 531 formed into a box shape corresponding to the outer shape of the nozzle block 31. This cap body 531 includes an opening open upward. Rising members 532 are provided to sandwich this opening from both sides in the width direction Dy on the upper end of the cap body 531, and each rising member 532 rises upward. A sealing member 533 is attached to a top part of each rising member 532. A strip-like component made of rubber can be, for example, used as the sealing member 533.

In the standby state (FIG. 2A) where the maintenance unit 50 is facing the printing head 30 from below, the plurality of caps 53 are respectively facing the plurality of corresponding nozzle blocks 31 from below. Further, although not shown in FIG. 4, each cap 53 is supported while being biased upward by a biasing member 56 arranged on the bottom plate 521 of the bat 52. The biasing member 56 is, for example, a compression spring. Thus, if the printing head 30 is positioned at a capped position (FIG. 6) in the height direction Dz as described later, each cap 53 caps the corresponding nozzle block 31. At this time, the sealing members 533 are held in contact with a lower surface part of the printing head 30 by biasing forces of the elastic members 523. In this way, a space surrounding the nozzle block 31 is closed. As a result, the drying of the ink around the respective nozzles (FIG. 3) is suppressed.

Further, if the printing head 30 is positioned to a purging position (FIG. 6) above the capping position Pc, the elastic members 523 are separated downward from the lower surface part of the printing head 30 and only the sealing members 533 are in contact with the lower surface part of the printing head 30. In this state, a purging process can be performed by discharging the ink from the respective nozzles N if necessary.

The ink discharged into the cap 53 is discharged via an unillustrated discharging mechanism. Those described in JP 2022-052195A previously disclosed by the applicant of this application can be, for example, suitably applied for such a mechanism and the purging process realized thereby. Thus, this mechanism and the purging process are not described.

As shown in FIG. 4, elevating mechanisms 58 and wiper blades 59 supported movably upward and downward by the elevating mechanisms 58 are provided inside the smaller bat 57. The elevating mechanism 58 can be constituted by an appropriate actuator. Two elevating mechanisms 58 and two wiper blades 59 are provided to respectively correspond to the two nozzle block rows C1, C2. Note that the wiper blade 59 corresponding to the nozzle blocks 31*a* is referred to as a "wiper blade 59*a*" and the wiper blade 59 corresponding to the nozzle block 31*b* is referred to as a "wiper blade 59*b*". The controller 10 can adjust the position of the wiper blade 59 in the height direction Dz by controlling the elevating mechanism 58.

If the printing head 30 is positioned at a wiping position Pw (FIG. 6) above the purging position Pp, the caps 53 are separated from the printing head 30. Further, top parts 591 (upper ends) of the wiper blades 59 are positioned at positions slightly higher than the lower surfaces of the nozzle blocks 31, i.e. the nozzle opening planes 31P (FIG. 3). By moving the maintenance unit 50 in the (+X) direction in this state, the top parts 591 of the wiper blades 59 rub against the nozzle opening planes 31P of the nozzle blocks 31. In this way, the ink adhering to the nozzle opening planes 31P is wiped by the wiper blades 59 and the nozzle opening planes 31P are cleaned. The maintenance unit 50 moves to the (+X) direction side beyond an end surface of the printing head 30 to clean the nozzle opening planes 31P of all the nozzle blocks 31.

Figure 5A:
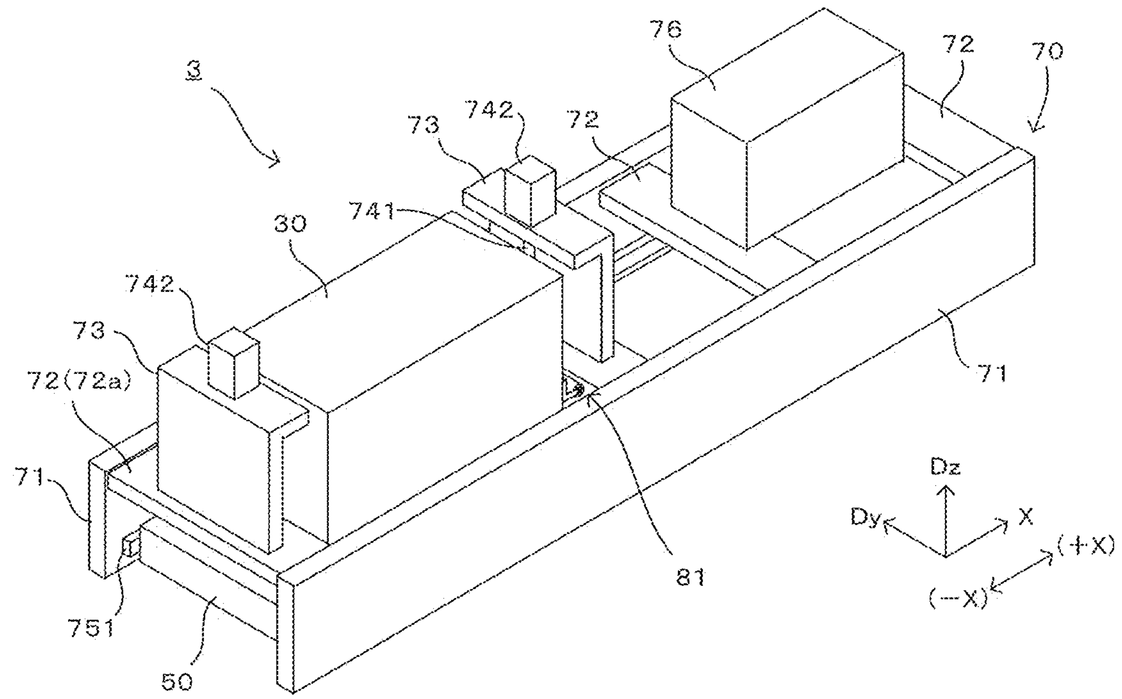
FIG. 5A is a perspective view showing the external appearance of the head unit 3.
Figure 5B:
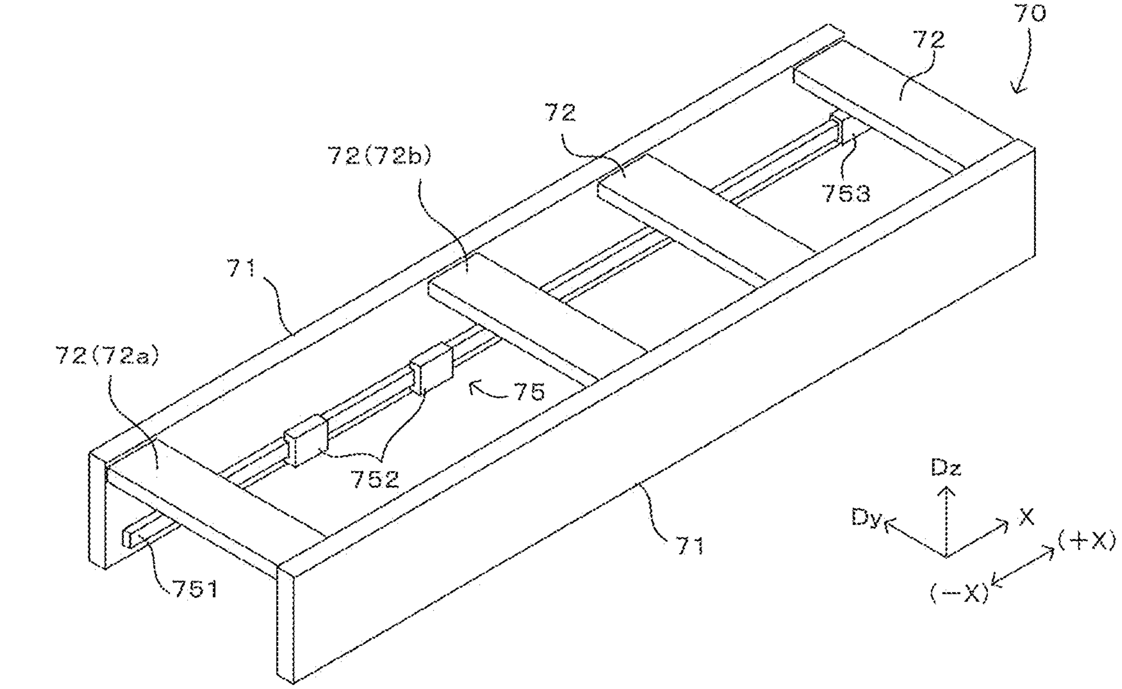
FIG. 5B is an external appearance perspective view showing a frame 70 of the head unit 3.
Figure 6:
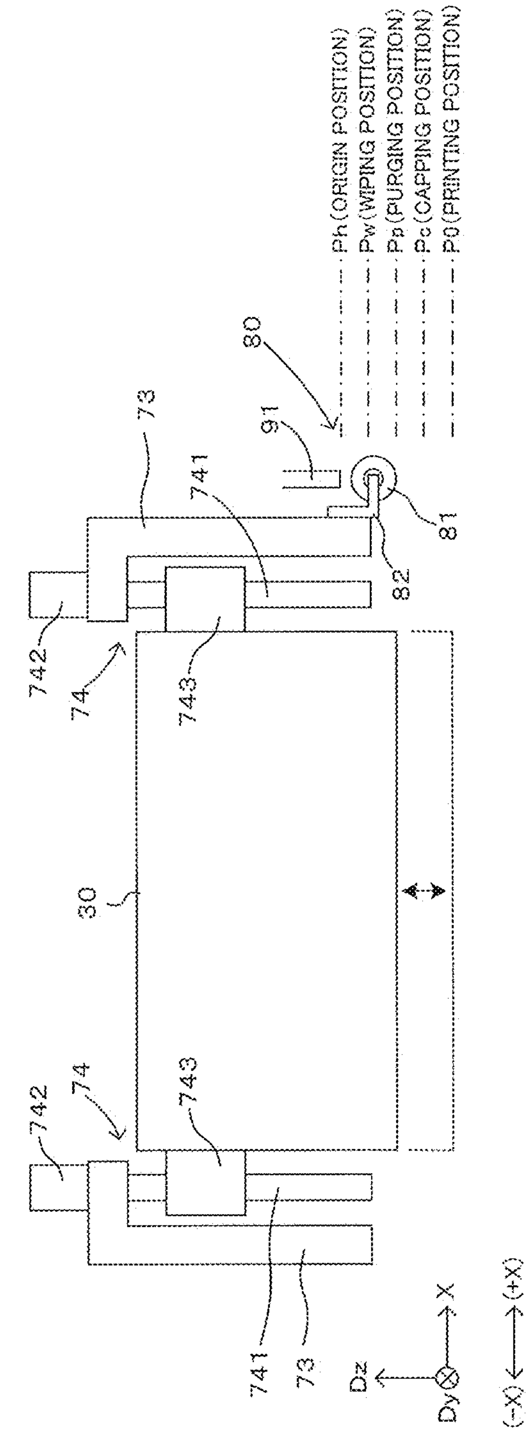
FIG. 6 is a side view showing the head unit 3.
Figure 7A:
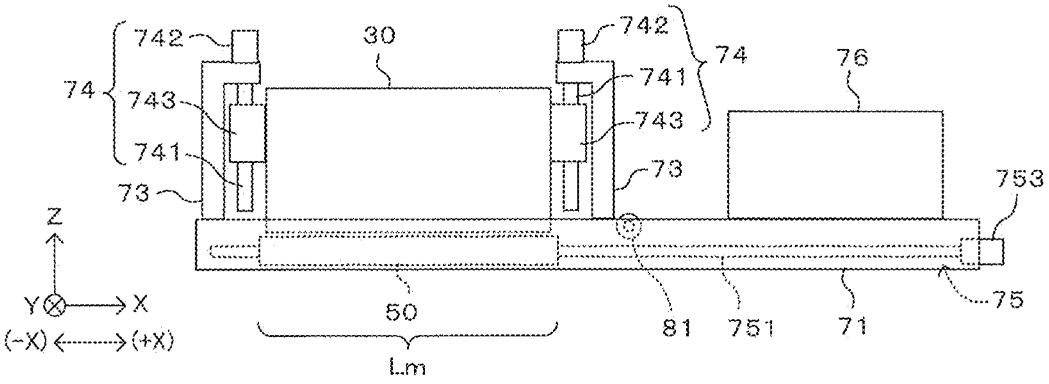
FIG. 7A is a side view showing the operation of the head unit 3.
Figure 7B:
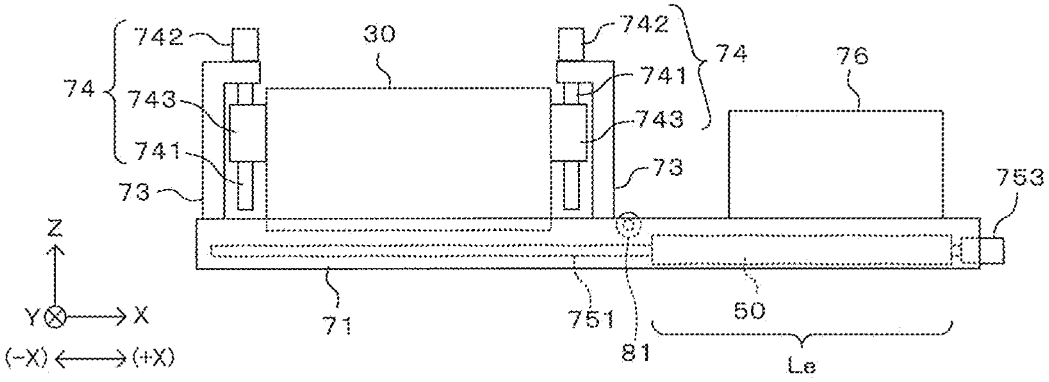
FIG. 7B is a side view showing the operation of the head unit 3.
Figure 7C:
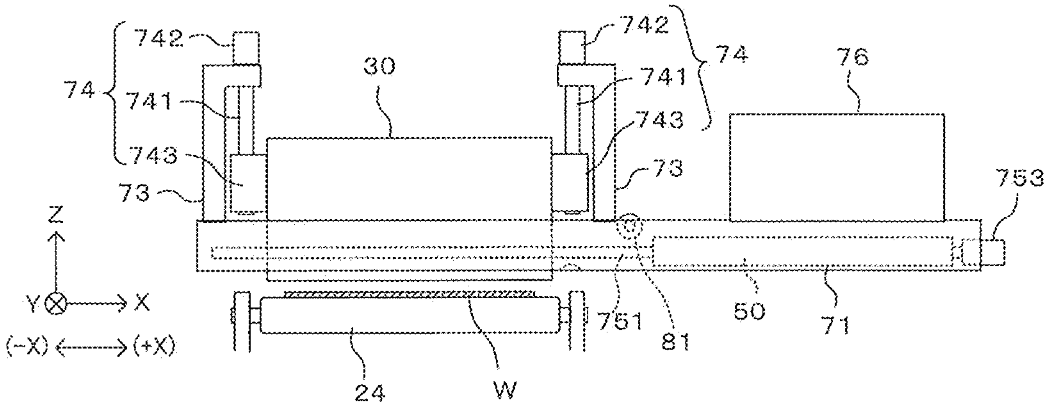
FIG. 7C is a side view showing the operation of the head unit 3.

Next, the structure of the head unit 3 is described in detail with reference to FIGS. 5A, 5B, 6, 7A, 7B and 7C. FIG. 5A is a perspective view showing the external appearance of the head unit 3, and FIG. 5B is an external appearance perspective view showing a frame 70 of the head unit 3. The head unit 3 is structured such that various components are mounted in the frame 70 shown in FIG. 5B. To clearly show a frame structure shielded by these components, a structure in which several components are mounted in the frame 70 before main components are mounted is shown in FIG. 5B. Further, FIG. 6 is a side view showing the head unit 3. FIGS. 7A to 7C are side views showing the operation of the head unit 3.

As shown in FIG. 5B, the frame 70 includes a pair of frame members 71 arranged to face each other across a gap in the width direction Dy. The respective frame members 71 extend in the X direction in parallel. Further, the frame 70 includes a plurality of beam members 72 extending in the width direction Dy between the pair of frame members 71, and the respective beam members 72 couple the pair of frame members 70 to each other. The shape of the frame members 71, the shape, the arrangement, the number and the like of the beam members 72 are arbitrary without being limited to those shown. However, the maintenance unit 50 reciprocates in the X direction between the pair of frame members 71 as described later. Therefore, the frame 70 is desirably structured not to hinder a movement of the maintenance unit 50.

On the (−−X) direction side of the frame members 71, two beam members 72 (72*a*, 72*b*) are arranged with a predetermined interval formed therebetween in the X direction. This interval is larger than a length in the X direction of the printing head 30. Head supporting side plates 73, 73 for supporting the printing head 30 movably upward and downward are mounted on the upper surfaces of these beam members 72*a*, 72*b*.

Further, as shown in FIG. 6, the head support side plates 73, 73 are respectively provided with elevating mechanisms 74, 74. The elevating mechanism 74 includes a ball screw 741 extending in the height direction Dz, a motor 742 for rotating and driving the ball screw 741 and an elevation block 743 attached to a nut of the ball screw 741. The elevation block 743 is disposed to an end part in the X direction of the printing head 30. Such elevating mechanisms 74 are arranged on both sides in the X direction of the printing head 30. Therefore, the controller 10 can raise and lower the printing head 30 in the height direction Dz according to the elevation blocks 743, 743 by synchronously rotating the motors 742, 742.

Further, a cleaning unit 80 is attached to an end part on the (+X) direction side of the head support side plate 73. This cleaning unit 80 is neither raised nor lowered in the height direction Dz according to upward and downward movements of the printing head 30. Further, the controller 10 raises and lowers the printing head 30 in the height direction Dz by the motors 742, 742. In this way, the controller 10 can position the printing head 30 at each of the capping position Pc, the purging position Pp, the wiping position Pw, a printing position P0 and an origin position Ph. The capping position Pc, the purging position Pp and the wiping position Pw are as described above. The printing position P0 is a position at which the printing head 30 executes printing, and the origin position Ph is a position to which the printing head 30 retracts upward.

Note that, as shown in FIG. 6, the capping position Pc, the purging position Pp, the wiping position Pw, the printing position P0 and the origin position Ph are defined on the basis of the height position of the lower surface of the printing head 30 in the height direction Dz in this specification. The capping position Pc is above the printing position P0, the purging position Pp is above the capping position Pc, the wiping position Pw is above the purging position Pp and the origin position Ph is above the wiping position Pw.

As shown in FIG. 5B, a guide rail 751 extending in the X direction is mounted on the inner surface of each of the pair of frame members 71. Sliders 752 are engaged with this guide rail 751 movably in the X direction. Further, a motor 753 for driving the sliders 752 in the X direction is provided. The maintenance unit 50 is mounted on the sliders 752.

Accordingly, the controller 10 can move the maintenance unit 50 in the X direction by controlling the motors 753. That is, the maintenance unit 50 moves in the X direction along the guide rails 751 between the pair of frame members 71 as shown in FIGS. 7A and 7B. As just described, the guide rail 751, the sliders 752 and the motor 753 function as a moving mechanism 75 for moving the maintenance unit 50 in the X direction. An appropriate one can be selected, for example, from a linear motor, a ball screw mechanism, an air cylinder, a belt drive mechanism and the like and used as such a moving mechanism 75.

The head unit 3 having such a structure can take states respectively shown in FIGS. 7A, 7B and 7C. In the state shown in FIG. 7A, the printing head 30 is retracted upward and the maintenance unit 50 is located at a maintenance position Lm facing the printing head 30 from below. In the state shown in FIG. 7B, the maintenance unit 50 is located at a retracted position Le retracted in the (+X) direction from the maintenance position Lm. In the state shown in FIG. 7C, the maintenance unit 50 is retracted to the retracted position Le and the printing head 30 is lowered below the frame members 71. As is understood from comparison with FIGS. 2, the state shown in FIG. 7A corresponds to FIG. 2A, the state shown in FIG. 7B corresponds to FIG. 2B and the state shown in FIG. 7C corresponds to FIG. 2C.

Referring back to FIG. 5A, the head unit 3 is further described. An electrical box 76 is mounted on the (+X) direction side of the frame members 71. The electrical box 76 stores various devices for properly operating the head unit 3 such as a control circuit for controlling the printing head 30 and the moving mechanisms 75, a pump for feeding out the ink toward the printing head 30 and a power supply circuit for supplying power to these. By mounting the electrical box 76 provided with these on the frame members 71 integrally with the printing head 30, a stable operation can be realized by suppressing lengths of pipes and cables to the printing head 30.

Further, as described above, the head unit 3 includes the cleaning unit 80 provided on the side surface on the (+X) direction side of the head support side plate 73. This cleaning unit 80 removes the ink from the caps 53 and the wiper blades 59 provided in the maintenance unit 50. Next, the cleaning unit 80 is described in detail.

Figure 8A:
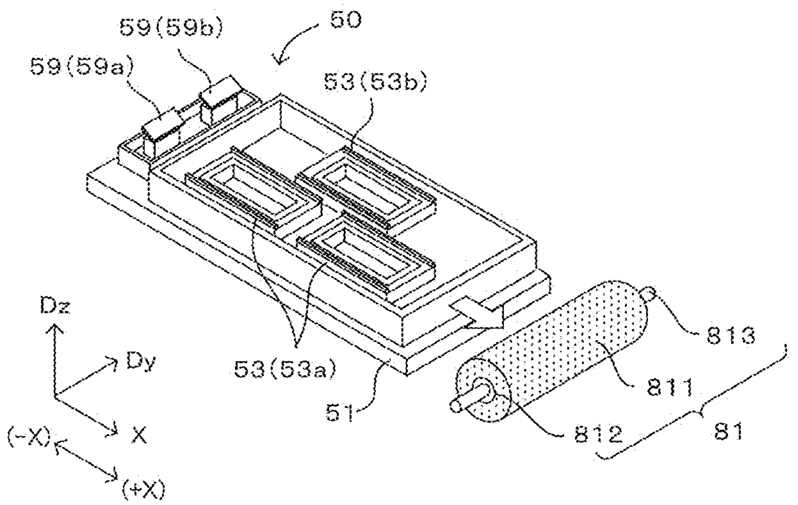
FIG. 8A is a perspective view schematically showing the configurations of the maintenance unit and the cleaning unit.
Figure 8B:
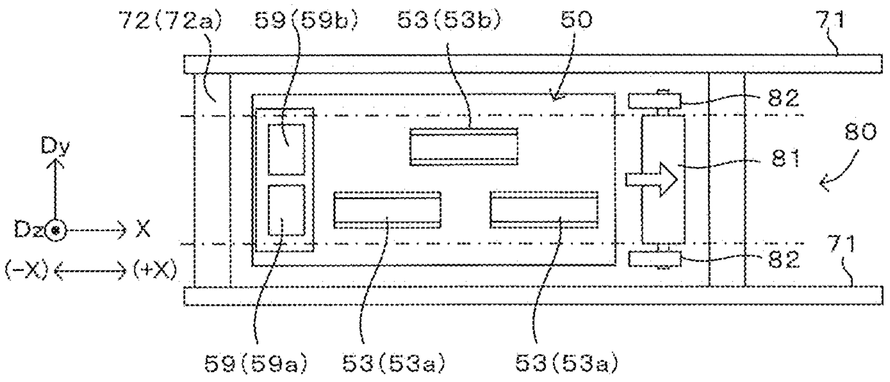
FIG. 8B is a plan view schematically showing the configurations of the maintenance unit and the cleaning unit.

FIG. 8A is a perspective view schematically showing the configurations of the maintenance unit and the cleaning unit. FIG. 8B is a plan view schematically showing the configurations of the maintenance unit and the cleaning unit. The printing head 30, the head support side plates 73 and the elevation mechanisms 74 are not shown in these figures. However, as described above, the cleaning unit 80 is mounted on the side surface on the (+X) direction side of the head support side plate 73. This cleaning unit 80 cleans objects to be cleaned of the maintenance unit 50 moving in the X direction by contacting the objects to be cleaned.

The cleaning unit 80 includes a cleaning roller 81 and a pair of bearing members 82. The pair of bearing members 82 are mounted on an end in the (+X) direction of the printing head 30 and rotatably support the cleaning roller 81. In the width direction Dy, the cleaning roller 81 has a length equivalent to an interval between one-dot chain lines of FIG. 8B. As shown in FIG. 8B, in the width direction Dy, the sealing members 533 of the caps 53 and the top parts 591 of the wiper blades 59 are included between both ends of the cleaning roller 81 (the pair of one-dot chain lines).

Traces of the sealing members 533 when the maintenance unit 50 moves in the (+X) direction overlap the cleaning roller 81. Further, traces of the top parts 591 of the wiper blades 59 when the maintenance unit 50 moves in the (+X) direction overlap the cleaning roller 81. That is, during a cleaning process, the cleaning roller 81 is mounted to contact top parts of the objects to be cleaned (sealing members 533, wiper blades 59) of the maintenance unit 50.

The cleaning roller 81 includes a surface layer 811 on the outer peripheral surface thereof. The surface layer 811 is made of sponge, which is a porous material, and has liquid retention of retaining the cleaning liquid and elasticity. Specifically, the cleaning roller 81 includes a core metal 812 made of metal and having a cylindrical shape parallel to the width direction Dy and the cylindrical surface layer 81 is arranged around the core metal 812. A rotary shaft 813 is provided coaxially with a center of the core metal 812, and both ends of the rotary shaft 813 are rotatably supported by the pair of bearing members 82, 82.

Next, the operations of the maintenance unit 50 and the cleaning unit 80 are described in detail using FIGS. 9A to 9E. Note that, as shown in FIGS. 9A to 9E, the printing apparatus 1 is provided with a cleaning liquid supplier 90 for supplying the cleaning liquid to the cleaning roller 81. This cleaning liquid supplier 90 is mounted at a position on an end of the side surface on the (+X) direction side of the head supporting side plate 73 and immediately above the cleaning roller 81. Note that, in FIGS. 9A to 9E, the cleaning liquid supplier 90 is shown in a simplified manner by one nozzle 91 (cleaning liquid discharge nozzle) facing the cleaning roller 81 from above. However, the cleaning liquid supplier 90 has a detailed configuration to be described later.

Figure 9A:
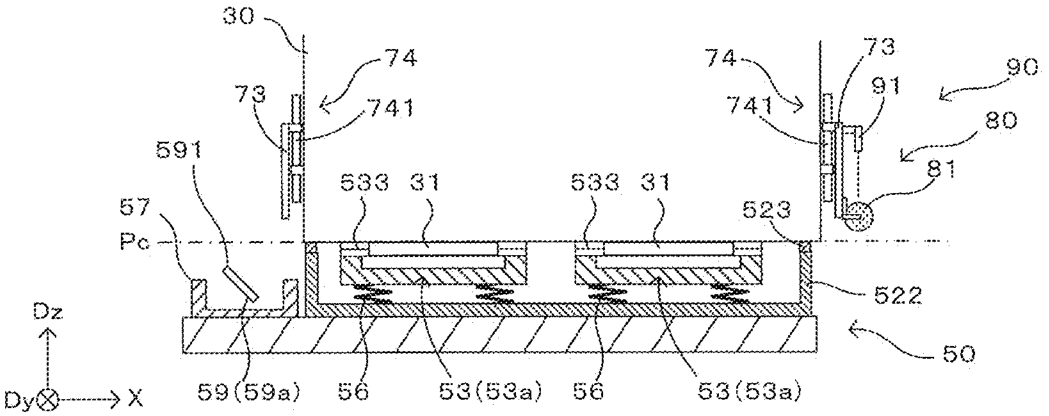
FIG. 9A is a diagram schematically showing an operation of a maintenance unit and a cleaning unit.

FIG. 9A is a diagram schematically showing a positional relationship of the printing head 30, the maintenance unit 50, the cleaning roller 81 and the nozzles 91 in the standby state. In this standby state, as shown in FIG. 9A, the maintenance unit 50 is positioned at the maintenance position Lm (FIG. 7A) immediately below the printing head 30 in the X direction and the printing head 30 is positioned at the capping position Pc in the height direction Dz. In this way, the respective nozzle blocks 31 are surrounded by the caps 53. Spaces around the nozzle blocks 31 are closed by the sealing members 533 and biasing forces of the biasing members 56. In this way, the drying of the ink around the respective nozzles N (FIG. 3) is suppressed.

In this standby state, the controller 10 causes the cleaning liquid to drip down to the cleaning roller 81 and wet the surface layer 811 of the cleaning roller 81 by causing the cleaning liquid to be discharged from the nozzles 91. If the supply of the cleaning liquid to the cleaning roller 81 is completed, the controller 10 stops the discharge of the cleaning liquid from the nozzles 91.

In this way, the cleaning roller 81 waits on standby while retaining an amount of the cleaning liquid suitable for the cleaning process in the standby state. By a transition from this standby state to a maintenance state, a pressure purging process and a wiping process are performed and the cleaning process by the cleaning roller 81 is performed as described in detail below.

Figure 9B:
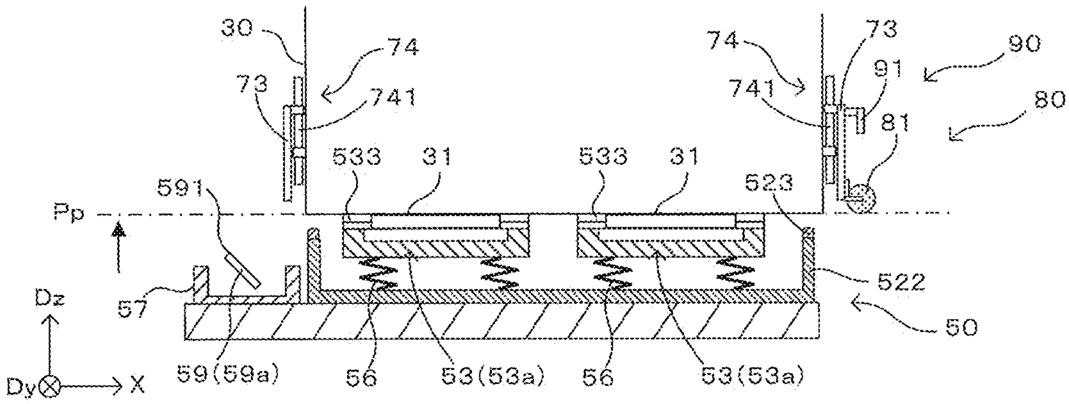
FIG. 9B is a diagram schematically showing an operation of a maintenance unit and a cleaning unit.

FIG. 9B is a diagram schematically showing a positional relationship of the printing head 30, the maintenance unit 50, the cleaning roller 81 and the nozzles 91 during the pressure purging process. When the pressure purging process is performed, the controller 10 causes the printing head 30 to be raised from the capping position Pc to the purging position Pp as indicated by an arrow in FIG. 9B. In this way, the elastic members 523 of the bat 52 are separated from the lower surface of the printing head 30. On the other hand, the sealing members 533 of the caps 53 are kept in contact with the lower surface of the printing head 30 by upward extension of the biasing members 56. Subsequently, the controller 10 causes the ink to be discharged from each nozzle N (purging process).

To wipe the ink flowing out from the nozzles N by this purging process, the controller 10 controls each component of the apparatus as follows to prepare for the wiping process. That is, the printing head 30 is raised from the purging position Pp to the origin position Ph. In this state, the controller 10 moves the maintenance unit 50 in the (+X) direction.

Figure 9C:
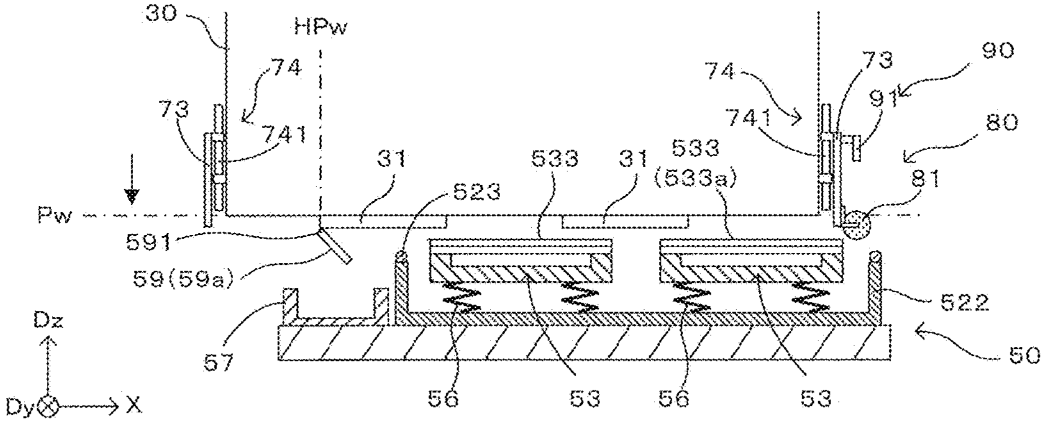
FIG. 9C is a diagram schematically showing an operation of a maintenance unit and a cleaning unit.

If the top part 591 of the wiper blade 59 reaches a wiping start position HPw in the X direction as shown in FIG. 9C, the controller 10 stops a movement of the maintenance unit 50. In this embodiment, the wiping start position HPw is set for the nozzle block 31 on the (−X) direction side of the nozzle block row C1. More particularly, as shown in FIG. 9C, the wiping start position HPw is set for a side located most on the (−X) direction side of this nozzle block 31. Further, the controller 10 lowers the printing head 30 from the origin position Ph to the wiping position Pw and raises the wiper blade 59 corresponding to the nozzle block row C1 at this wiping start position HPw. By these, the top part 591 of the wiper blade 59 is positioned at a position slightly higher than the lower surface of the nozzle block 31 and contacts the lower surface of the nozzle block 31. In this way, preparation for the wiping process is completed.

Figure 9D:
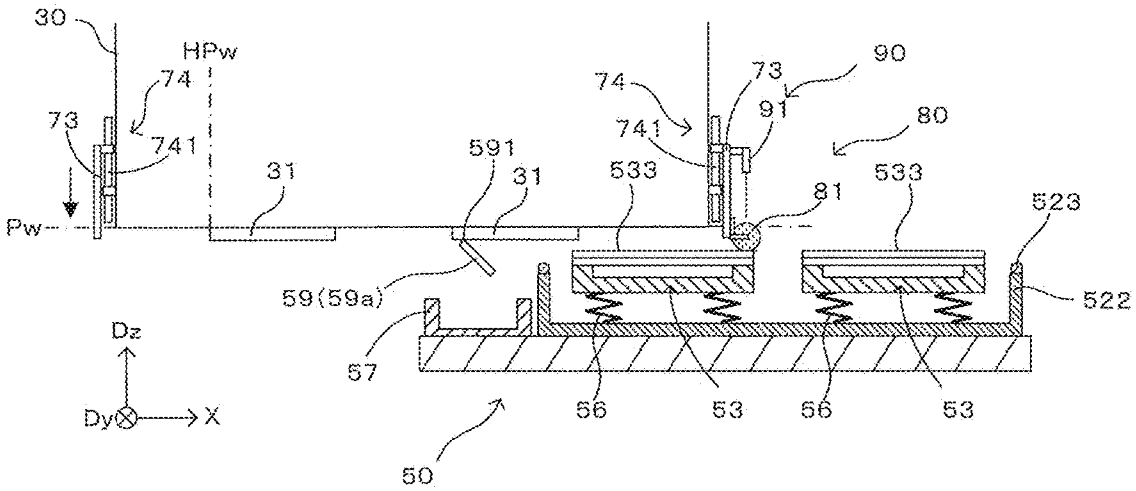
FIG. 9D is a diagram schematically showing an operation of a maintenance unit and a cleaning unit.

From this state, the controller 10 moves the maintenance unit 50 in the (+X) direction. According to this movement, the top part 591 of the wiper blade 59 rubs the lower surfaces (nozzle opening planes 31P) of the nozzle blocks 31 and wipes the ink adhering around the nozzles N (wiping process) as shown in FIG. 9D. In parallel with that, the cleaning roller 81 retaining the cleaning liquid is driven to rotate while contacting the top parts of the sealing members 533 and cleans and removes the ink adhering to the caps 53 (cap cleaning process). Note that, in this cap cleaning process, the lower surfaces of the nozzle blocks 31 do not contact the top parts of the sealing members 533. Such wiping process and cap cleaning process are performed according to a movement of the maintenance unit 50 in the (+X) direction. In this cap cleaning process, the cleaning liquid may be discharged from the nozzles 91 toward the cleaning roller 81.

Figure 9E:
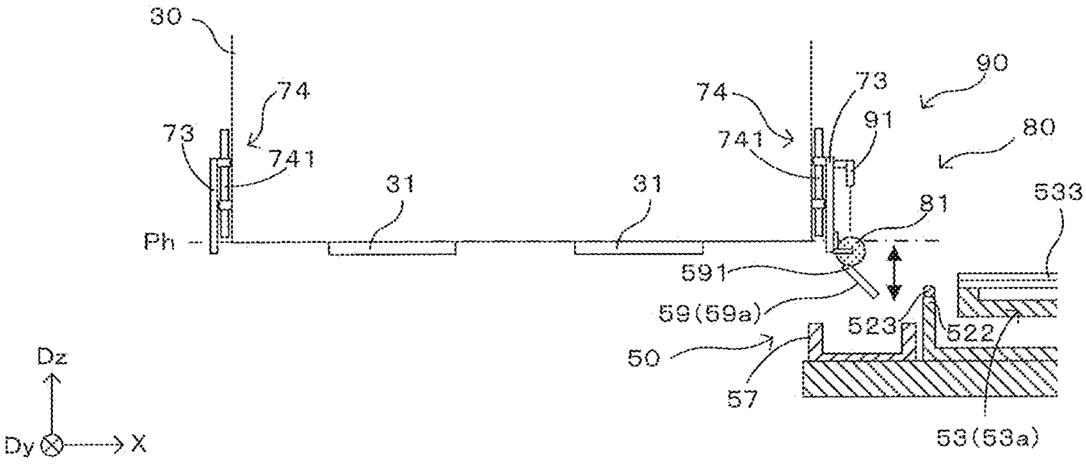
FIG. 9E is a diagram schematically showing an operation of a maintenance unit and a cleaning unit.

If the wiping process and the cap cleaning process are completed, the controller 10 prepares for a wiper cleaning process by controlling each component of the apparatus as described next. That is, the printing head 30 is raised from the wiping position Pw to the original position Ph. Subsequent to that, if the top part 591 of the wiper blade 59 reaches the wiping start position HPw in the X direction as shown in FIG. 9E, the controller 10 stops a movement of the maintenance unit 50.

After the preparation for the wiper cleaning process is completed, the maintenance unit 50 is so positioned that the cleaning roller 81 faces the top part 591 of the wiper blade 59 from above. Accordingly, the controller 10 performs cleaning by bringing the surface layer 811 of the cleaning roller 81 retaining the cleaning liquid into contact with the top part 591 of the wiper blade 59. That is, the controller 10 cleans the top part 591 of the wiper blade 59 while shifting contact positions of the cleaning roller 81 and the wiper blade 59 in the Z direction by reciprocating the wiper blade 59 by a minute distance in the Z direction (wiper cleaning process). Note that the controller 10 may clean the top part 591 of the wiper blade 59 by the cleaning roller 81 while reciprocating the maintenance unit 50 by a minute distance in the X direction. Further, in the wiper cleaning process, the cleaning liquid may be discharged toward the cleaning roller 81 from the nozzle 91.

If the wiper cleaning process is completed, the controller 10 causes a return to the standby state shown in FIG. 2A by moving the maintenance unit 50 in the (−X) direction.

Note that although the pressure purging process, the wiping process, the cap cleaning process and the wiper cleaning process corresponding to the nozzle blocks 31 corresponding to the nozzle block row C1 are mainly described above, the pressure purging process, the wiping process, the cap cleaning process and the wiper cleaning process corresponding to the nozzle block 31 corresponding to the nozzle block row C2 are similarly performed.

Further, the printing apparatus 1 is provided with a cleaning block 85 for cleaning the cleaning roller 81 having the cleaning liquid supplied by the cleaning liquid supplier 90. Next, the cleaning liquid supplier 90 and the cleaning block 85 are described in detail.

Figure 10A:
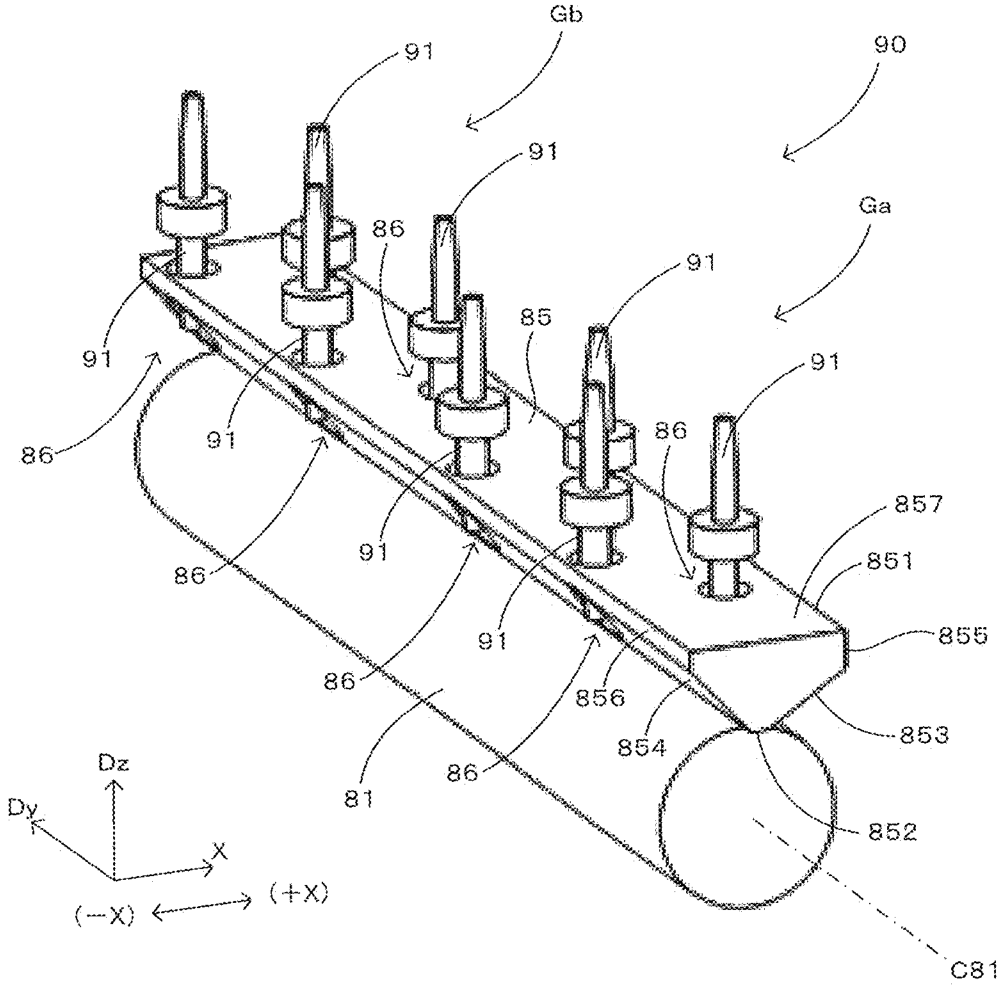
FIG. 10A is a perspective view showing a positional relationship of the nozzles of the cleaning liquid supplier, the cleaning block and the cleaning roller.
Figure 10B:
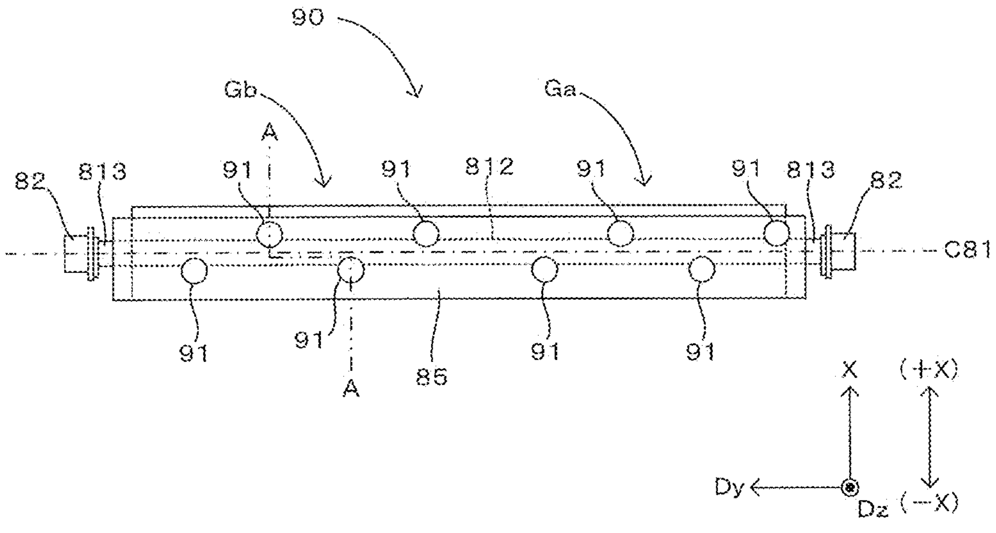
FIG. 10B is a plan view showing the positional relationship of the nozzles of the cleaning liquid supplier, the cleaning block and the cleaning roller.
Figure 10C:
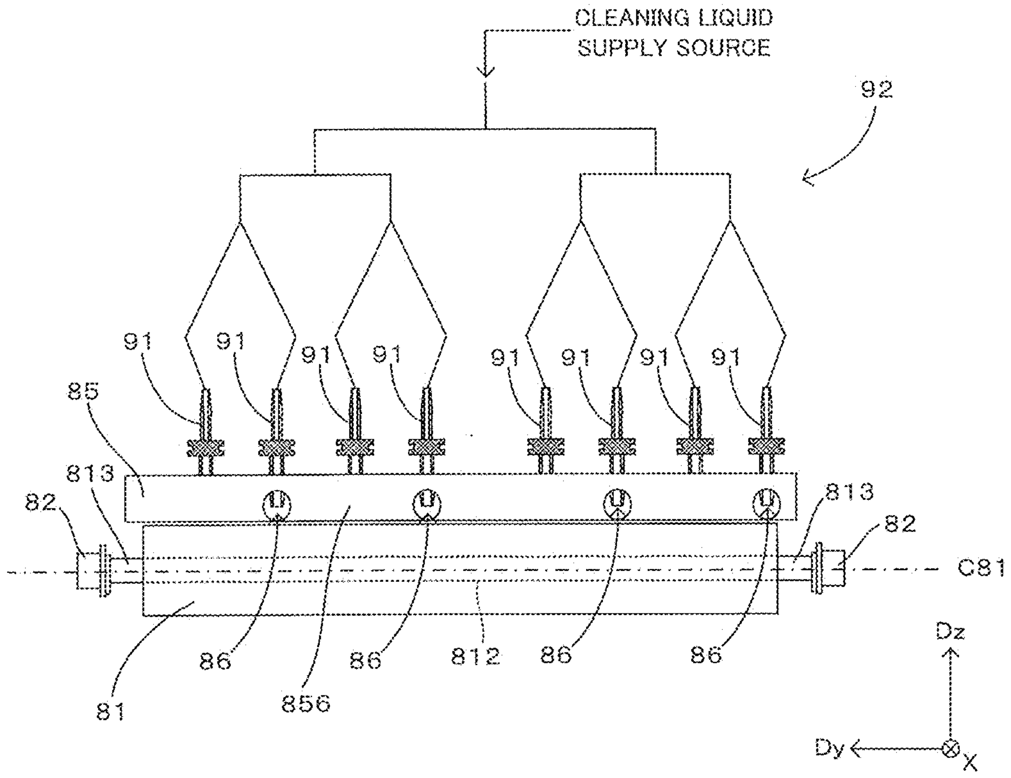
FIG. 10C is a front view showing the positional relationship of the nozzles of the cleaning liquid supplier, the cleaning block and the cleaning roller.

FIG. 10A is a perspective view showing a positional relationship of the nozzles of the cleaning liquid supplier, the cleaning block and the cleaning roller, FIG. 10B is a plan view showing the positional relationship of the nozzles of the cleaning liquid supplier, the cleaning block and the cleaning roller, and FIG. 10C is a front view showing the positional relationship of the nozzles of the cleaning liquid supplier, the cleaning block and the cleaning roller. In these figures, a rotation center line C81 of the cleaning roller 81 is shown. That is, the cleaning roller 81 rotates about the rotation center line C81.

The cleaning liquid supplier 90 includes M nozzles 91 arrayed in the Y direction in a staggered manner (M is an integer equal to or greater than two). Although M is eight in this example, the number M of the nozzles 91 of the cleaning liquid supplier 90 is not limited to eight. As is understood from FIG. 10B, in plan view from the height direction Dz, the M nozzles 91 include (+M) nozzles 91 eccentrically arranged on the (+X) direction side from the rotation center line C81 and (−M) nozzles 91 eccentrically arranged on the (−X) direction side from the rotation center line C81 ((+M) and (−M) are integers equal to or greater than one). In this example, (+M) and (−M) are respectively four, but the number (+M) of the nozzles 91 on the (+X) direction side and the number (−M) of the nozzles 91 on the (−X) direction side are both not limited to four.

Further, the M nozzles 91 include the nozzles 91 of a nozzle group Ga provided to correspond to the wiper blade 59*a* and the caps 53*a* and the nozzles 91 of a nozzle group Gb provided to correspond to the wiper blade 59*b* and the cap 53*b*. The nozzle group Ga is composed of Na nozzles 91 arranged on one side in the Y direction (Na is an integer equal to or greater than one). Although Na is four in this example, the number Na of the nozzles 91 belonging to the nozzle group Ga is not limited to four. The nozzles 91 belonging to the nozzle group Ga face, from above in the height direction Dz, a range of the cleaning roller 81 configured to contact the sealing members 533 of the caps 53*a* and the wiper blade 59*a*, and discharge the cleaning liquid to this range. The nozzle group Gb is composed of Nb nozzles 91 arranged on the other side in the Y direction (Nb is an integer equal to or greater than one). Although Nb is four in this example, the number Nb of the nozzles 91 belonging to the nozzle group Gb is not limited to four. The nozzles 91 belonging to the nozzle group Gb face, from above in the height direction Dz, a range of the cleaning roller 81 configured to contact the sealing members 533 of the cap **53*b* and the wiper blade 59*b*** and discharge the cleaning liquid to this range.

The cleaning block 85 includes a block body 851 long in the width direction Dy. The block body 851 is, for example, made of resin. A cleaning surface 852 facing the cleaning roller 81 from above is provided on the lower end (end on the lower side in the height direction Dz) of the block body 851. The cleaning surface 852 is a flat surface parallel to the X direction and the width direction Dy. In the width direction Dy, the cleaning surface 852 is longer than the cleaning roller 81 and the cleaning roller 81 is located between both ends of the block body 851. This cleaning surface 852 contacts the cleaning roller 81 from above in the height direction Dz.

Further, the block body 851 has inclined surfaces 853, 854 on both sides of the cleaning surface 852 in the X direction. The inclined surface 853 is a flat surface provided on the (+X) direction side of the cleaning surface 852 and inclined upward side in the height direction Dz toward the (+X) direction. The inclined surface 854 is a flat surface provided on the (−X) direction side of the cleaning surface 852 and inclined upward side in the height direction Dz toward the (−X) direction. Further, the block body 851 has a side surface 855 extending upward in the height direction Dz from the upper end of the inclined surface 853 and a side surface 856 extending upward in the height direction Dz from the upper end of the inclined surface 854. The side surfaces 855, 856 are flat surfaces parallel to the width direction Dy and the height direction Dz. Further, the block body 851 has an upper surface 857 provided between the upper ends of the respective side surfaces 855, 856. The upper surface 857 is a flat surface parallel to the X direction and the width direction Dy.

The cleaning block 85 includes M nozzle insertion holes 86 respectively corresponding to the M nozzles 91. The nozzle insertion hole 86 is provided to penetrate through the block body 851 in the height direction Dz, and the nozzle 91 corresponding to the nozzle insertion hole 86 is inserted into the nozzle insertion hole 86. In this way, the M nozzles 91 are respectively inserted into the corresponding M nozzle insertion holes 86. The M nozzle insertion holes 86 include (+M) nozzle insertion holes 86 eccentrically arranged on the (+X) direction side from the rotation center line C81 and (−M) nozzle insertion holes 86 eccentrically arranged on the (−X) direction side from the rotation center line C81. The (+M) nozzle insertion holes 86 are open toward the lower side in the height direction Dz in the inclined surface 853. The (−M) nozzle insertion holes 86 are open toward the lower side in the height direction Dz in the inclined surface 854. The (+M) nozzles 91 are respectively inserted into the (+M) nozzle insertion holes 86, and the (−M) nozzles 91 are respectively inserted into the (−M) nozzle insertion holes 86.

Further, the cleaning liquid supplier 90 includes a manifold 92 connecting the M nozzles 91 to a cleaning liquid supply source. The cleaning liquid supply source is, for example, the utility of a facility where the printing apparatus 1 is installed. The manifold 92 branches the cleaning liquid supplied from the cleaning liquid supply source and individually supplies the cleaning liquid to each of the M nozzles 91. The cleaning liquid has, for example, a composition obtained by excluding pigments from the ink.

Figure 10D:
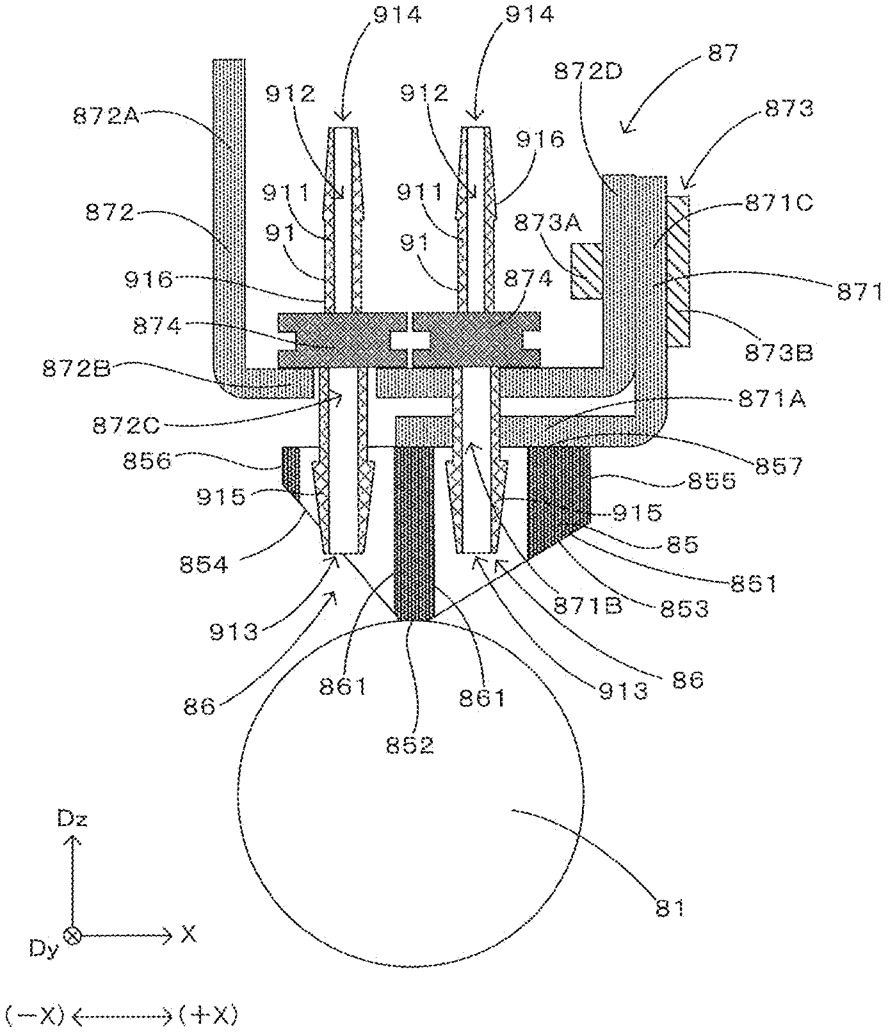
FIGS. 10D and 10E are diagrams showing partial cross-sections of the nozzles, the cleaning block, and a block support unit for supporting and the cleaning block.
Figure 10E:
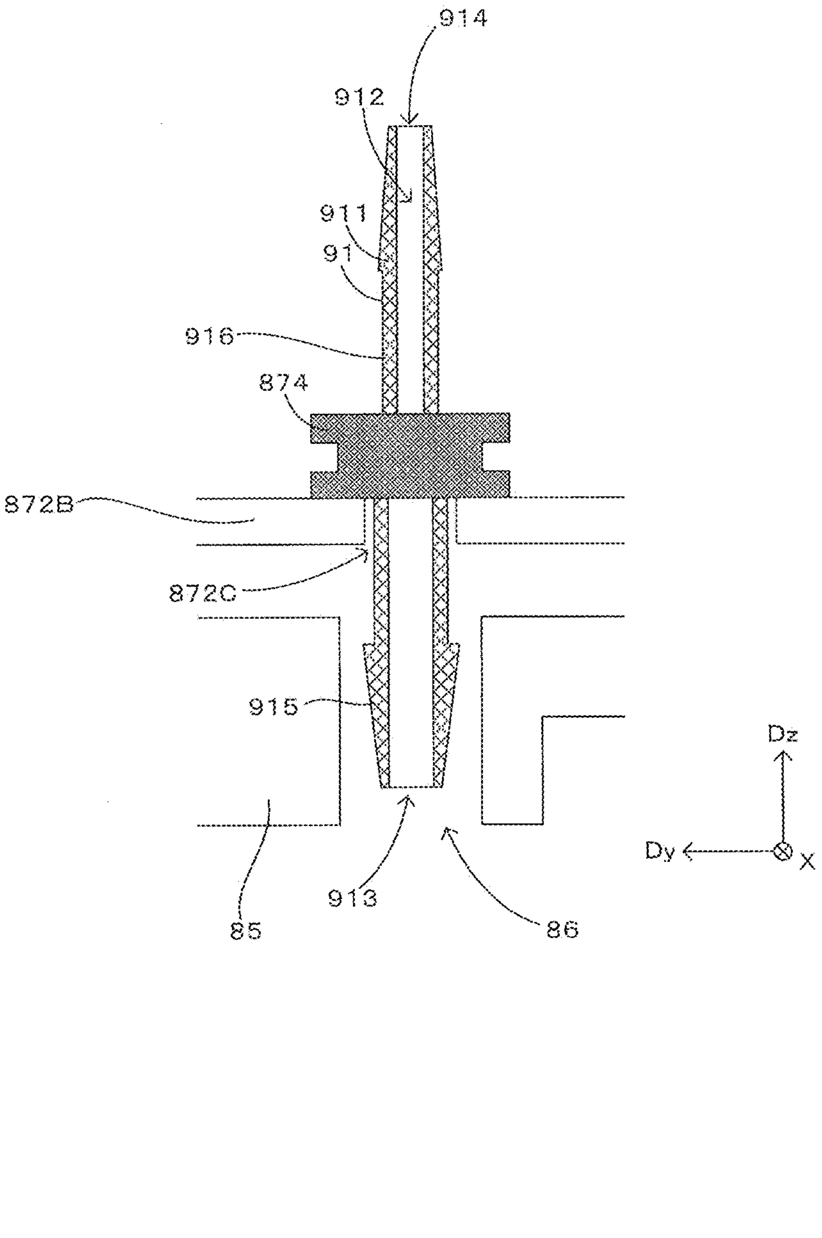

FIGS. 10D and 10E are diagrams showing partial cross-sections of the nozzles, the cleaning block, and a block support unit for supporting and the cleaning block. A cross-section along A-A shown in FIG. 10B is shown in FIG. 10D, and a cross-section in the width direction Dy is shown in FIG. 10E. As shown in these figures, the nozzle 91 includes a nozzle body 911 extending in the height direction Dz and a cleaning liquid supply path 912 penetrating through the nozzle body 911 in the height direction Dz, and openings 913, 914 are provided in both ends in the height direction Dz of the cleaning liquid supply path 912. The upper opening 914 in the height direction Dz is connected to the manifold 92, and the lower opening 913 is facing the cleaning roller 81 from above. The cleaning liquid supplied from the manifold 92 flows into the cleaning liquid supply path 912 through the opening 914, and is discharged to the cleaning roller 81 through the opening 913.

A lower end part 915 of the nozzle 91 is inserted into the nozzle insertion hole 86, and a projecting part 916 above the lower end part 915 projects further upward in the height direction than the upper surface 857 of the cleaning block 85. The opening 913 of the nozzle 91 is located above the lower end of the nozzle insertion hole 86, into which this nozzle 91 is inserted, in the height direction Dz. Further, a gap is provided in the X direction and the width direction Dy between the lower end part 915 of the nozzle 91 and an inner peripheral surface 861 of the nozzle insertion hole 86, and the lower end part 915 of the nozzle 91 and the inner peripheral surface 861 of the nozzle insertion hole 86 do not contact each other.

The block support unit 87 supports the cleaning block 85 on the side surface on the (+X direction) side of the head supporting side plate 73. The block support unit 87 includes an L-shaped frame 871 to be mounted on the cleaning block 85. The L-shaped frame 871 includes a mounting part 871A fixed to the upper surface 857 of the cleaning block 85. The mounting part 871A extends in the X direction, and an end part in the (+X) direction of the mounting part 871A projects in the (+X) direction from the upper surface 857 of the cleaning block 85. This mounting part 871A is provided with through holes 871B penetrating in the height direction Dz. The through hole 871B faces the nozzle insertion hole 86, and the projecting part 916 of the nozzle 91 to be inserted into the nozzle insertion hole 86 passes through the through hole 871B. Further, the L-shaped frame 871 includes an extending part 871C extending upward in the height direction Dz from the end part in the (+X) direction of the mounting part 871A.

Further, the block support unit 87 includes a U-shaped frame 872 to be mounted on the side surface on the (+X direction) side of the head supporting side plate 73. The U-shaped frame 872 includes a mounting part 872A to be fixed to an end in the (+X) direction of the side surface on the (+X direction) side of the head supporting side plate 73. The mounting part 872A extends in the height direction Dz, and the lower end of the mounting part 872A in the height direction Dz is located above the mounting part 871A of the L-shaped frame 871. Further, the U-shaped frame 872 includes an extending part 872B extending toward the (+X) direction side from a lower end part of the mounting part 872A. The extending part 872B of the U-shaped frame 872 is facing the mounting part 871A of the L-shaped frame 871 from above while being spaced apart therefrom. The extending part 872B is provided with through holes 872C penetrating in the height direction Dz. The through hole 872C faces the nozzle insertion hole 86, and the projecting part 916 of the nozzle 91 to be inserted into the nozzle insertion hole 86 passes through the through hole 872C. Further, the U-shaped frame 872 includes an extending part 872D extending upward in the height direction Dz from an end part in the (+X) direction of the extending part 872B.

The extending part 871C of the L-shaped frame 871 and the extending part 872D of the U-shaped frame 872 are attached by a fastening member 873. The fastening member 873 is composed of a bolt 873A and a nut 873B. That is, each of the extending parts 872D, 871C is provided with a screw insertion hole penetrating in the X direction, and a tip part of the bolt 873A inserted into these screw insertion holes from the (−X) direction side projects in the (+X) direction from the extending part 871C. Then, the nut 873B is threadably engaged with the tip part of the bolt 873A. Note that the screw insertion hole provided in the extending part 871C of the L-shaped frame 871 is a long hole long in the height direction Dz. Therefore, the L-shaped frame 871 is attached movably in the height direction Dz with respect to the U-shaped frame 872. This movement of the L-shaped frame 871 in the height direction Dz is accompanied by a movement of the cleaning block 85 in the height direction Dz.

Further, the block support unit 87 includes nozzle holders 874 for holding the nozzles 91 with respect to the U-shaped frame 872. The nozzle holder 874 is placed on the extending part 872B of the U-shaped frame 872 and holds the projecting parts 916 of the nozzles 91. In this way, the nozzles 91 are mounted on the side surface on the (+X direction) side of the head supporting side plate 73 via the U-shaped frame 872.

Figure 10F:
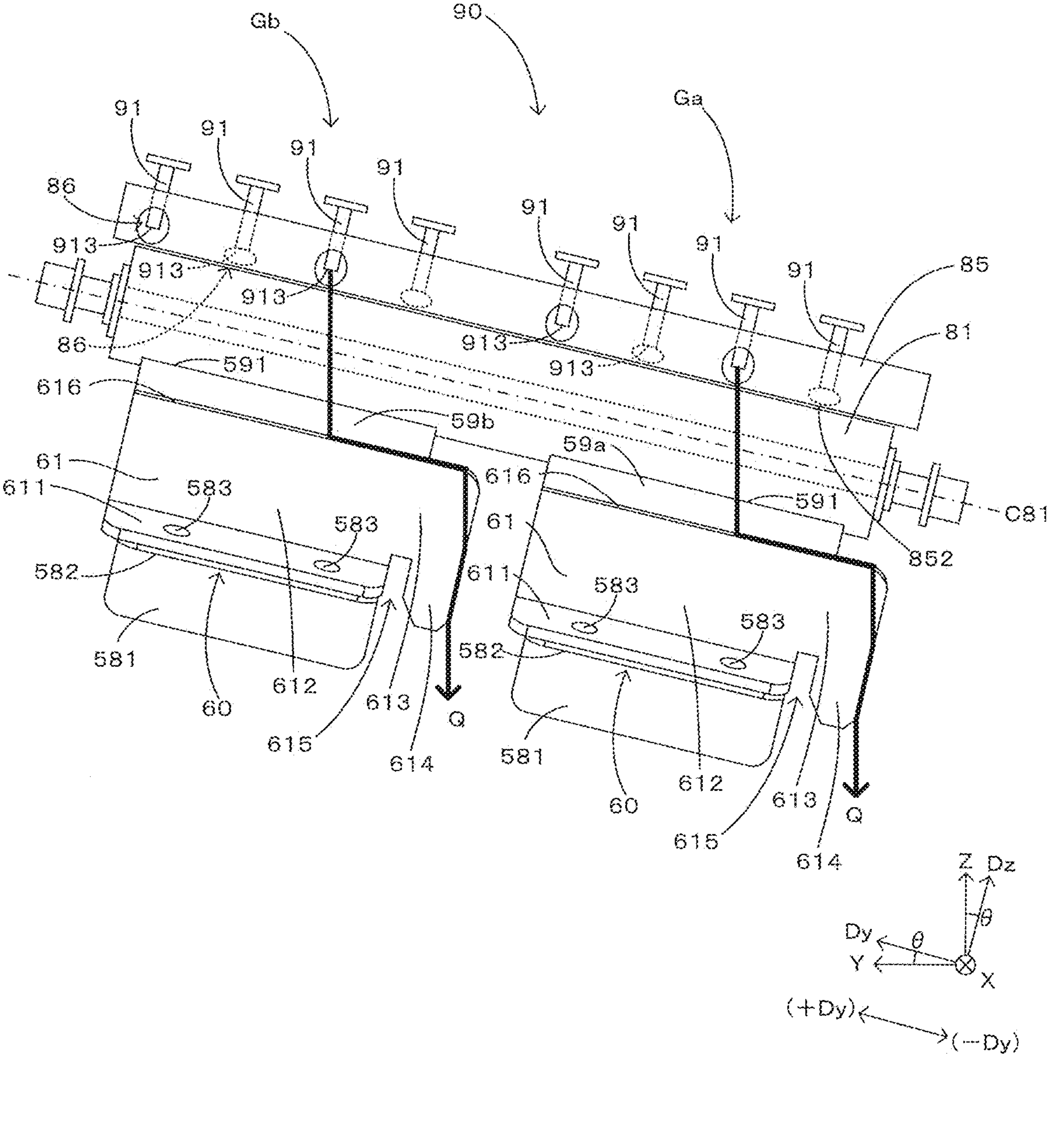
FIG. 10F is a diagram schematically showing flow passages of the cleaning liquid discharged to the cleaning roller.

FIG. 10F is a diagram schematically showing flow passages of the cleaning liquid discharged to the cleaning roller. In FIG. 10F, a (+Dy) direction and a (−Dy) direction respectively parallel to the Y direction and opposite to each other are shown. An angle θ of inclination of the cleaning roller 81 with respect to the Y direction and the structures of wiper supports 60 are related to these flow passages of the cleaning liquid. That is, as shown in FIG. 10F, the printing apparatus 1 includes the wiper supports 60 supporting the wiper blades 59. The wiper support 60 is provided for each of the two wiper blades 59*a*, 59*b*. The wiper support 60 includes a support frame 61, and the support frame 61 is mounted on an elevating member 581 included in the elevating mechanism 58. In this way, the support frame 61 supports the wiper blade 59 with respect to the elevating member 581 of the elevating mechanism 58. Therefore, the elevating mechanism 58 raises and lowers the wiper blade 59 in the height direction Dz by driving the elevating member 581 in the height direction Dz.

A support plate 582 parallel to the X direction and the width direction Dy is provided on the upper end of the elevating member 581. In contrast, the support frame 61 includes a mounting part 611 to be mounted on the upper surface in the height direction Dz of the support plate 582. This mounting part 611 has a flat plate shape parallel to the X direction and the width direction Dy and is fastened to the support plate 582 by screws 583.

Further, the support frame 61 includes a rising part 612 rising upward in the height direction Dz from an end part in the (+X) direction of the mounting part 611. This rising part 612 has a flat plate shape parallel to the width direction Dy and the height direction Dz and extends in the width direction Dy. A lower guiding part 613 projecting in the (−Dy) direction from the mounting part 611 is provided on an end part in the (−Dy) direction of the rising part 612. A projecting piece 614 projecting further downward in the Z direction than the mounting part 611 is provided on a lower end part of the lower guiding part 613. Further, the lower guiding part 613 includes a cut 615 between the projecting piece 614 and the mounting part 611 in the width direction Dy. The cut 615 extends further upward than the mounting part 611 in the height direction Dz and forms a gap between the projecting piece 614 and the mounting part 611.

The wiper blade 59 is attached to a side surface in the X direction ((+X) direction) of the rising part 612 of the support frame 61. A slope 616 provided on the upper surface of the rising part 612 projects in the X direction ((−X) direction) from the wiper blade 59 in the X direction. The top part 591 of the wiper blade 59 projects further upward in the height direction Dz than the slope 616 of the support frame 61. In the width direction Dy, the slope 616 spans across the rising part 612 and the lower guiding part 613. In other words, the slope 616 is provided over the entire region of the wiper blade 59 in the width direction Dy and projects further in the (−Dy) direction than the wiper blade 59. The slope 616 is inclined by the angle θ with respect to the Y direction and descends from the (+Dy) direction side toward the (−Dy) direction side.

In such a configuration, the cleaning liquid Q discharged to the cleaning roller 81 from the opening 913 of the nozzle 91 drops down by gravity inside the surface layer 811 of the cleaning roller 81. Since the cleaning roller 81 is inclined by the angle θ with respect to the Y direction, the cleaning liquid Q successively wets the surface layer 811 of the cleaning roller 81 while spreading along an axial direction (direction of the rotation center line C81) of the cleaning roller 81. In this way, the surface layer 811 of the cleaning roller 81 retains the cleaning liquid Q, which is spread along the axial direction thereof. Further, as described above, the cleaning roller 81 contacts the objects to be cleaned (sealing members 533 and wiper blades 59) moving in the X direction and is driven to rotate about the rotation center line C81. In this way, the cleaning surface 852 of the cleaning block 85 contacts the cleaning roller 81 driven to rotate while retaining the cleaning liquid Q, whereby an adhering substance (ink) of the cleaning roller 81 is removed from the cleaning roller 81.

Further, the cleaning liquid Q dropped down along the wiper blade 59 from the cleaning roller 81 drops down on the slope 616 of the support frame 61. Since this slope 616 descends toward the lower guiding part 613, the cleaning liquid Q is guided to the lower guiding part 613 by the slope 616. Further, the cleaning liquid Q having reached the lower guiding part 613 drops down by gravity and is discharged downward from the projecting piece 614.

In the embodiment described above, the cleaning roller 81 (roller) extends in the width direction Dy (inclination direction) inclined with respect to the Y direction (horizontal direction). The cleaning liquid Q is supplied to this cleaning roller 81 from above. The cleaning liquid Q supplied to the cleaning roller 81 in this way moves downward by gravity. At this time, since the cleaning roller 81 is inclined with respect to the Y direction, the cleaning liquid Q spreads also in an extension direction of the cleaning roller 81 (i.e. width direction Dy) according to a downward movement. In this way, the cleaning liquid Q can be efficiently spread to the cleaning roller 81.

Further, the cleaning roller 81 is rotatable about the rotation center line C81 parallel to the width direction Dy. This cleaning roller 81 moves the adhering substance (ink) from the wiper blade 59 to the cleaning roller 81 by rotating, following the wiper blade 59, while being held in contact with the wiper blade 59 (wiper) moving with respect to the cleaning roller 81 in the X direction orthogonal to the rotation center line C81. The wiper blade 59 can be properly cleaned by the cleaning roller 81 driven to rotate in this way.

Further, the cleaning roller 81 contacts the wiper blade 59 reciprocating with respect to the cleaning roller 81 in the X direction. By reciprocating the wiper blade 59 in this way, the wiper blade 59 can be efficiently cleaned.

Further, the cleaning block 85 contacts the cleaning roller 81 at the cleaning surface 852 (flat surface) provided on the lower end. In such a configuration, it can be suppressed that the cleaning block 85 hinders the rotation of the cleaning roller 81 by biting into the cleaning roller 81.

Further, the cleaning liquid supplier 90 includes the nozzles 91 arranged above the cleaning roller 81, and supplies the cleaning liquid Q to the cleaning roller 81 from the nozzles 91. In such a configuration, the cleaning liquid Q can be precisely supplied to the cleaning roller 81 by the nozzles 91.

Further, the cleaning block 85 includes the block body 851 configured to contact the cleaning roller 81 and the nozzle insertion holes 86 provided in the block body 851. The nozzles 91 are inserted into the nozzle insertion holes 86 and face the cleaning roller 81 from above. In such a configuration, space saving can be achieved by compactly arranging the cleaning block 85 and the nozzles 91.

Further, the gap is provided between the inner peripheral surface 861 of the nozzle insertion hole 86 and the nozzle 91. In such a configuration, it can be suppressed that the cleaning liquid Q discharged from the nozzle 91 adheres to the inner peripheral surface 861 of the nozzle insertion hole 86.

Further, the cleaning roller 81 is rotatable about the rotation center line C81 parallel to the width direction Dy (inclination direction). The cleaning liquid supplier 90 includes the plurality of nozzles 91 arranged above the cleaning roller 81. The plurality of these nozzles 91 include the nozzles 91 (one-side nozzles) arranged on the (+X) direction side (one side) and the nozzles 91 (other-side nozzles) arranged on the (−X) direction side (other side) with respect to a virtual plane passing through the rotation center line C81 and extending in a vertical direction, i.e. the rotation center line C81 in a plan view from the Z direction. In such a configuration, the cleaning liquid Q can be efficiently spread to the cleaning roller 81 by supplying the cleaning liquid Q to the cleaning roller 81 on both sides of the rotation center line C81 of the cleaning roller 81.

Further, the support frame 61 (wiper support) is provided which supports the wiper blade 59 by being mounted on the side surface in the X direction of the wiper blade 59. The wiper blade 59 projects from the slope 616 (upper end surface) of the support frame 61, and the slope 616 extends in the width direction Dy. The cleaning liquid Q adhering to this slope 616 is guided along the slope 616 and discharged downward from a lower end part of the slope 616. In such a configuration, the cleaning liquid Q adhering to the support frame 61 can be guided by the slope 616 on the upper end of the support frame 61 and properly discharged downward from the lower end part of the slope 616.

Further, the support frame 61 includes the lower guiding part 613 (cleaning liquid guiding part) extending downward from the lower end part of the slope 616 and the rising part 612 and the mounting part 611 (support body) above the lower guiding part 613 along the slope 616 and extending downward from the slope 616. The lower guiding part 613 includes the projecting piece 614 projecting further downward than the lower end of the mounting part 611. The cleaning liquid Q guided to the lower end part of the slope 616 drops down along the lower guiding part 613 and is discharged downward from the projecting piece 614. In such a configuration, the adhesion of the cleaning liquid Q to the rising part 612 and the mounting part 611 of the support frame 61 can be suppressed.

Further, the cut 615 (gap) is provided between the mounting part 611 (support body) and the projecting piece 614. In such a configuration, the adhesion of the cleaning liquid Q to the mounting part 611 of the support frame 61 can be more reliably suppressed.

Further, the cleaning roller 81 is a sponge roller made of sponge. In such a configuration, the cleaning liquid Q can be sucked into the cleaning roller 81 and spread to the cleaning roller 81.

Further, the cleaning block 85 is supported vertically movably in the height direction Dz. Thus, the cleaning block 85 moves upward according to the expansion of the cleaning roller 81 due to an increase of the cleaning liquid Q adhering to the cleaning roller 81 and moves downward according to the shrinkage of the cleaning roller 81 due to a decrease of the cleaning liquid Q adhering to the cleaning roller 81. In such a configuration, the cleaning block 85 can be brought into contact with the cleaning roller 81 with a suitable force.

In the embodiment described above, the nozzle opening plane 31P corresponds to an example of a "nozzle opening plane" of the disclosure, the printing head 30 corresponds to an example of an "inkjet head" of the disclosure, the wiper blade 59 corresponds to an example of a "wiper" of the disclosure, the Y direction corresponds to an example of a "horizontal direction" of the disclosure, the width direction Dy corresponds to an example of an "inclination direction" of the disclosure, the cleaning roller 81 corresponds to an example of a "roller" of the disclosure, the cleaning liquid Q corresponds to an example of a "cleaning liquid" of the disclosure, the cleaning liquid supplier 90 corresponds to an example of a "cleaning liquid supplier" of the disclosure, the cleaning block 85 corresponds to an example of a "cleaning block" of the disclosure, the printing apparatus 1 corresponds to an example of a "printing apparatus" of the disclosure, the rotation center line C81 corresponds to an example of a "rotation center line" of the disclosure, the nozzle 91 corresponds to an example of a "nozzle" of the disclosure, the block body 851 corresponds to an example of a "block body" of the disclosure, the nozzle insertion hole 86 corresponds to an example of a "nozzle insertion hole" of the disclosure, the support frame 61 corresponds to an example of a "wiper support" of the disclosure, the lower guiding part 613 corresponds to an example of a "cleaning liquid guiding part" of the disclosure, the rising part 612 and the mounting part 611 correspond to an example of a "support body" of the disclosure, and the projecting piece 614 corresponds to an example of a "projecting piece" of the disclosure.

Note that the disclosure is not limited to the embodiment described above and various changes other than the aforementioned ones can be made without departing from the gist of the disclosure. For example, the shape of the cleaning block 85 is not limited to the above example. Therefore, the cleaning surface 852 may not be a flat surface and may be a curved surface curved downward or upward or an uneven surface.

Further, a positional relationship of the nozzle 91 and the nozzle insertion hole 86 may be changed as appropriate. For example, the lower end of the nozzle 91 may project further downward than the lower end of the nozzle insertion hole 86.

Further, the nozzle 91 needs not be arranged in the nozzle insertion hole 86 provided in the cleaning block 85 and the nozzle 91 may be arranged at a position deviated from the cleaning block 85.

Further, the specific configuration of the wiper support 60 for supporting the wiper blade 59 may be changed as appropriate.

Further, it is not essential that all the cleaning rollers 81 provided for the respective colors are inclined with respect to the Y direction in the printing apparatus 1. If at least some cleaning rollers 81 are inclined with respect to the Y direction, the above effects can be achieved for these some cleaning rollers 81.

The printing apparatus may be configured so that the roller is rotatable about a rotation center line parallel to the inclination direction and moves the adhering substance from the wiper to the roller by rotating, following the wiper, while contacting the wiper relatively moving with respect to the roller in a moving direction orthogonal to the rotation center line. The wiper can be properly cleaned by the roller driven to rotate in this way.

The printing apparatus may be configured so that the roller contacts the wiper relatively reciprocating with respect to the roller in the moving direction. By relatively reciprocating the wiper in this way, the wiper can be efficiently cleaned.

The printing apparatus may be configured so that the cleaning block contacts the roller at a flat surface provided on its lower end. In such a configuration, it can be suppressed that the cleaning block hinders the rotation of the roller by biting into the roller.

The printing apparatus may be configured so that the cleaning liquid supplier includes a nozzle arranged above the roller and supplies the cleaning liquid from the nozzle to the roller. In such a configuration, the cleaning liquid can be precisely supplied to the roller by the nozzle.

The printing apparatus may be configured so that the cleaning block includes a block body for contacting the roller and a nozzle insertion hole provided in the block body, and the nozzle is inserted into the nozzle insertion hole and faces the roller from above. In such a configuration, space saving can be achieved by compactly arranging the cleaning block and the nozzle.

The printing apparatus may be configured so that a gap is provided between an inner peripheral surface of the nozzle insertion hole and the nozzle. In such a configuration, it can be suppressed that the cleaning liquid discharged from the nozzle adheres to the inner peripheral surface of the nozzle insertion hole.

The printing apparatus may be configured so that the roller is rotatable about a rotation center line parallel to the inclination direction, the cleaning liquid supplier includes a one-side nozzle and an other-side nozzle arranged above the roller and supplies the cleaning liquid to the roller from each of the one-side nozzle and the other-size nozzle, and the one-side nozzle is arranged on one side of a virtual plane passing through the rotation center line and extending in a vertical direction, and the other side nozzle is arranged on the other side of the virtual plane. In such a configuration, the cleaning liquid can be efficiently spread to the roller by supplying the cleaning liquid to the roller on both sides of the rotation center line of the roller.

The printing apparatus may further comprises a wiper support which is mounted on a side surface of the wiper to support the wiper, wherein: the wiper projects from an upper end surface of the wiper support, the upper end surface is a slope extending in the inclination direction, and the cleaning liquid adhering to the upper end surface is guided along the slope and discharged downward from a lower end part of the slope. In such a configuration, the cleaning liquid adhering to the wiper support can be guided by the slope on the upper end of the wiper support and properly discharged downward from the lower end part of the slope.

The printing apparatus may be configured so that the wiper support includes a cleaning liquid guiding part extending downward from the lower end part of the slope and a support body above the cleaning liquid guiding part on the slope and extending downward from the slope, the cleaning liquid guiding part includes a projecting piece projecting further downward than a lower end of the support body, and the cleaning liquid guided to the lower end part of the slope drops down along the cleaning liquid guiding part and is discharged downward from the projecting piece. In such a configuration, the adhesion of the cleaning liquid to the support body of the wiper support can be suppressed.

The printing apparatus may be configured so that a gap is provided between the support body and the projecting piece. In such a configuration, the adhesion of the cleaning liquid to the support body of the wiper support can be more reliably suppressed.

The printing apparatus may be configured so that the roller is a sponge roller made of sponge. In such a configuration, the cleaning liquid can be sucked into the roller and spread to the roller.

The printing apparatus may be configured so that the cleaning block is supported vertically movably, moves upward according to expansion of the roller due to an increase of the cleaning liquid adhering to the roller and moves downward according to shrinkage of the roller due to a decrease of the cleaning liquid adhering to the roller. In such a configuration, the cleaning block can be brought into contact with the roller with a suitable force.

The disclosure is applicable to general maintenance techniques of roller for cleaning a wiper for wiping an ink from a nozzle opening plane of an inkjet device including an opening for discharging the ink.

What is claimed is:

1. A printing apparatus, comprising:

an inkjet head including a nozzle opening plane having an opening for discharging an ink;

a wiper which wipes the ink from the nozzle opening plane by contacting the nozzle opening plane of the inkjet head;

a roller which extends in an inclination direction inclined with respect to a horizontal direction and contacts the wiper;

a cleaning liquid supplier which supplies a cleaning liquid to the roller from above the roller; and a cleaning block which contacts the roller, the roller cleaning the wiper by moving an adhering substance adhering to the wiper to the roller by contacting the wiper, and the cleaning block cleaning the roller by contacting the roller to which the cleaning liquid is supplied.

2. The printing apparatus according to claim 1, wherein:

the roller is rotatable about a rotation center line parallel to the inclination direction and moves the adhering substance from the wiper to the roller by rotating, following the wiper, while contacting the wiper relatively moving with respect to the roller in a moving direction orthogonal to the rotation center line.

3. The printing apparatus according to claim 2, wherein:

the roller contacts the wiper relatively reciprocating with respect to the roller in the moving direction.

4. The printing apparatus according to claim 2, wherein:

the cleaning block contacts the roller at a flat surface provided on its lower end.

5. The printing apparatus according to claim 1, wherein: the cleaning liquid supplier includes a nozzle arranged above the roller and supplies the cleaning liquid from the nozzle to the roller.

6. The printing apparatus according to claim 5, wherein: the cleaning block includes a block body for contacting the roller and a nozzle insertion hole provided in the block body, and the nozzle is inserted into the nozzle insertion hole and faces the roller from above.

7. The printing apparatus according to claim 6, wherein: a gap is provided between an inner peripheral surface of the nozzle insertion hole and the nozzle.

8. The printing apparatus according to claim 1, wherein: the roller is rotatable about a rotation center line parallel to the inclination direction, the cleaning liquid supplier includes a one-side nozzle and an other-side nozzle arranged above the roller and supplies the cleaning liquid to the roller from each of the one-side nozzle and the other-size nozzle, and the one-side nozzle is arranged on one side of a virtual plane passing through the rotation center line and extending in a vertical direction, and the other side nozzle is arranged on the other side of the virtual plane.

9. The printing apparatus according to claim 1, further comprising a wiper support which is mounted on a side surface of the wiper to support the wiper, wherein:

the wiper projects from an upper end surface of the wiper support, the upper end surface is a slope extending in the inclination direction, and the cleaning liquid adhering to the upper end surface is guided along the slope and discharged downward from a lower end part of the slope.

10. The printing apparatus according to claim 9, wherein: the wiper support includes a cleaning liquid guiding part extending downward from the lower end part of the slope and a support body above the cleaning liquid guiding part on the slope and extending downward from the slope, the cleaning liquid guiding part includes a projecting piece projecting further downward than a lower end of the support body, and the cleaning liquid guided to the lower end part of the slope drops down along the cleaning liquid guiding part and is discharged downward from the projecting piece.

11. The printing apparatus according to claim 10, wherein:

a gap is provided between the support body and the projecting piece.

12. The printing apparatus according to claim 1, wherein: the roller is a sponge roller made of sponge.

13. The printing apparatus according to claim 1, wherein: the cleaning block is supported vertically movably, moves upward according to expansion of the roller due to an increase of the cleaning liquid adhering to the roller and moves downward according to shrinkage of the roller due to a decrease of the cleaning liquid adhering to the roller.

14. A roller maintenance method for cleaning a wiper, which wipes an ink on a nozzle opening plane of an inkjet head including an opening for discharging the ink, comprising:

cleaning the wiper with a roller;

supplying a cleaning liquid from above to the roller extending in an inclination direction inclined with respect to a horizontal direction; and cleaning the roller by a cleaning block contacting the roller to which the cleaning liquid is supplied.

* * * * *